US010503943B2

(12) United States Patent
Alwesh et al.

(10) Patent No.: US 10,503,943 B2
(45) Date of Patent: Dec. 10, 2019

(54) LOG SCANNING SYSTEM

(71) Applicant: C 3 Limited, Tauranga (NZ)

(72) Inventors: Nawar Sami Alwesh, Flat Bush (NZ); Glen Edward Murphy, Lynmore (NZ); David William Penman, Avondale (NZ); Johann August Schoonees, Kohimarama (NZ); Robert Jan Valkenburg, Mount Albert (NZ)

(73) Assignee: C 3 Limited, Tauranga (NZ)

( * ) Notice: Subject to any disclaimer, the term of this patent is extended or adjusted under 35 U.S.C. 154(b) by 269 days.

(21) Appl. No.: 15/503,613

(22) PCT Filed: Aug. 13, 2015

(86) PCT No.: PCT/IB2015/056157
§ 371 (c)(1),
(2) Date: Feb. 13, 2017

(87) PCT Pub. No.: WO2016/024242
PCT Pub. Date: Feb. 18, 2016

(65) Prior Publication Data
US 2017/0235983 A1 Aug. 17, 2017

(30) Foreign Application Priority Data
Aug. 13, 2014 (NZ) ........................................ 628730

(51) Int. Cl.
*G06K 7/10* (2006.01)
*G06F 17/00* (2019.01)
(Continued)

(52) U.S. Cl.
CPC ............ *G06K 7/10722* (2013.01); *B07C 5/14* (2013.01); *G01B 11/25* (2013.01); *G06F 17/00* (2013.01);
(Continued)

(58) Field of Classification Search
USPC ......................................................... 235/385
See application file for complete search history.

(56) References Cited

U.S. PATENT DOCUMENTS 4,913,551 A * 4/1990 Davis ..................... G01B 11/00
356/2
5,307,294 A 4/1994 Aman et al.
(Continued)

FOREIGN PATENT DOCUMENTS

CN 101281021 10/2008
DE 10031410 A1 8/2001
(Continued)

OTHER PUBLICATIONS

"International Application No. PCT/IB2015/056157, International Search Report and Written Opinion dated Nov. 9, 2015", (Nov. 9, 2015), 9 pgs.
(Continued)

Primary Examiner — Rafferty D Kelly
(74) Attorney, Agent, or Firm — Scchwegman Lundberg & Woessner, P.A.

(57) ABSTRACT

A log scanning system and method for scanning a log load. Each individual log in the log load may have an ID element with a unique log ID data on at least one log end face. The system has a handheld scanner unit for free-form scanning by an operator over a load end face of the log load. The scanner unit has a depth sensor configured to capture a series of depth images of the load end face and a texture sensor configured to capture a series of texture images of the load end face during the load end face scan. The system also has a data processor(s) that receives and processes the depth and texture images captured from the scan. The processor(s) are configured to fuse the depth images or depth and texture images into a data model of the load end face, determine log end boundaries of the individual logs visible in the load end
(Continued)

face by processing the data model, process the texture images to identify and decode any ID elements visible in the scan to extract individual log ID data, and generate output data representing the log load based on the determined log end boundaries and extracted log ID data.

23 Claims, 28 Drawing Sheets

(51) Int. Cl.
<table>
<tr><td>B07C 5/14</td><td>(2006.01)</td></tr>
<tr><td>G01B 11/25</td><td>(2006.01)</td></tr>
<tr><td>G06T 7/12</td><td>(2017.01)</td></tr>
<tr><td>G06K 7/12</td><td>(2006.01)</td></tr>
<tr><td>G06K 7/14</td><td>(2006.01)</td></tr>
<tr><td>G06K 17/00</td><td>(2006.01)</td></tr>
<tr><td>G06Q 10/08</td><td>(2012.01)</td></tr>
</table>

(52) U.S. Cl.
CPC ............. *G06K 7/12* (2013.01); *G06K 7/1417* (2013.01); *G06K 17/0022* (2013.01); *G06Q 10/087* (2013.01); *G06Q 10/0875* (2013.01); *G06T 7/12* (2017.01); *G06K 2007/10524* (2013.01); *G06T 2207/10028* (2013.01); *G06T 2207/30161* (2013.01); *G06T 2207/30242* (2013.01)

(56) References Cited

U.S. PATENT DOCUMENTS

<table>
<tr><td>5,725,253 A</td><td>3/1998</td><td>Salive et al.</td></tr>
<tr><td>2009/0323121 A1</td><td>12/2009</td><td>Valkenburg et al.</td></tr>
<tr><td>2011/0298889 A1</td><td>12/2011</td><td>Seto</td></tr>
<tr><td>2013/0141568 A1</td><td>6/2013</td><td>Palma-amestoy</td></tr>
<tr><td>2013/0144568 A1*</td><td>6/2013</td><td>Palma-Amestoy ....... G06T 7/60 703/1</td></tr>
<tr><td>2014/0184749 A1</td><td>7/2014</td><td>Hilliges et al.</td></tr>
</table>

FOREIGN PATENT DOCUMENTS

<table>
<tr><td>EP</td><td>1194734 A1</td><td>4/2002</td></tr>
<tr><td>WO</td><td>WO-2004020938 A1</td><td>3/2004</td></tr>
<tr><td>WO</td><td>2005080949</td><td>9/2005</td></tr>
<tr><td>WO</td><td>WO-2010051818 A1</td><td>5/2010</td></tr>
<tr><td>WO</td><td>WO-2011000743 A1</td><td>1/2011</td></tr>
<tr><td>WO</td><td>WO-2012106069 A2</td><td>8/2012</td></tr>
<tr><td>WO</td><td>2016024242</td><td>2/2016</td></tr>
</table>

OTHER PUBLICATIONS

"European Application No. 15832255.2, Extended European Search Report dated Mar. 5, 2018", (Mar. 5, 2018), 4 pgs.

"International Application No. PCT/IB2015/056157, International Preliminary Report on Patentability dated Feb. 14, 2017", (Feb. 14, 2017), 5 pgs.

Bylow, Erik, et al., "Real-Time Camera Tracking and 3D Reconstruction Using Signed Distance Functions", 10.15607/RSS.2013. IX.035, (Jun. 23, 2013), 8 pgs.

Marshall, Hamish, "Automated Log Counting: Proof of Concept Algorithm", Theme: Radiata Management; Future Forests Research Report No. FFR-R014, (Jul. 5, 2009), 31 pgs.

\* cited by examiner

LOG SCANNING SYSTEM

PRIORITY CLAIM TO RELATED APPLICATIONS

This application is a U.S. national stage application filed under 35 U.S.C. § 371 from International Application Serial No. PCT/IB2015/056157, which was filed 13 Aug. 2015, and published as WO2016/024242 on 18 Feb. 2016, and which claims priority to New Zealand Application No. 628730, filed 13 Aug. 2014, which applications and publication are incorporated by reference as if reproduced herein and made a part hereof in their entirety, and the benefit of priority of each of which is claimed herein.

FIELD OF THE INVENTION

The invention relates to a log identification, measurement and/or counting system for use in the forestry industry.

BACKGROUND TO THE INVENTION

The log export industry in New Zealand and many other countries is required to count and barcode every log that is exported. After harvest, logs for export are typically delivered to a port on logging trucks or trailers. Upon arrival at the port, the load of logs on each truck is processed at a checkpoint or processing station. Typically, the number of logs in each load is counted and various measurements on each individual log are conducted to scale for volume and value, before being loaded onto ships for export.

Depending on the country, log scaling can be carried out according to various standards. In New Zealand, almost all logs exported are sold on volume based on the Japanese Agricultural Standard (JAS). Scaling for JAS volume typically involves measuring the small end diameter of each log and its length, and then calculating JAS volume based on these measurements. The log counting and scaling exercise is currently very labour intensive as it requires one or more log scalers per logging truck to count and scale each log manually. The log counting and scaling exercise can cause a bottleneck in the supply chain of the logs from the forest to the ship for export, or for supply to domestic customers.

To attempt to address the above issue, various automated systems have been proposed for assisting in automatic counting and measurement of logs. However, many of these currently proposed systems have various drawbacks which have limited their widespread adoption by the log export industry.

One such automated system is described in US patent application publication 2013/0144568. This system is a drive-through log measuring system for log loads on logging trucks. The system comprises a large structure mounting an array of lasers about its periphery and through which a logging truck may drive through. The system laser scans the log load on the back of the truck as it drives through and generates a 3D model of the log load. The 3D model is then processed to extract various characteristics of the logs, such as log diameters. This system is very large and expensive.

Another automated system for measuring logs is described in international PCT patent application publication WO 2005/080949. This system uses a stereo vision measuring unit mounted to a vehicle that is driven past a log pile on the ground and which captures stereo vision images of the log pile. The stereo images are then image processed to determine various physical properties of the logs, such as for measuring size and grading logs. This system requires a moving vehicle to move the measuring unit past the pile of logs situated on the ground and is not suited for measuring a log load in situ on a logging truck.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

It is an object of the invention to provide a system and method for identifying, measuring and/or counting individual logs in a log pile or log load, or to at least provide the public with a useful choice.

In a first aspect, the invention broadly consists in a log scanning system for scanning a load of logs (log load), each individual log in the log load comprising an ID element comprising unique log ID data on at least one log end face, the system comprising:

a handheld scanner unit for free-form scanning by an operator over a load end face of the log load, the scanner unit comprising:
  a depth sensor configured to capture a series of depth images of the load end face during the load end face scan, and
  a texture sensor configured to capture a series of texture images of the load end face during the load end face scan; and
a data processor or processors that receives the series of depth images and texture images captured from the scan, and which are configured to:
  fuse the depth images into a data model of the load end face;
  determine log end boundaries of the individual logs visible in the load end face by processing the data model;
  process the texture images to identify and decode any ID elements visible in the scanned load end face to extract individual log ID data for individual logs in the log load; and
  generate output data representing the log load based on the determined log end boundaries and extracted log ID data.

In an embodiment, the data processor or processors may be configured to generate output data by measuring one or more physical properties of the log ends based on the determined log end boundaries to generate representative log end boundary data for each log and the generated output data representing the log load comprises the log end boundary data for each log.

In an embodiment, the data processor or processors may be further configured to generate a link or association between the generated individual log ID data and its respective log end boundary data, and wherein the generated output data representing the log load comprises the link or association between the individual log ID data and its respective log end boundary data.

In an embodiment, the data processor or processors may be configured to generate output data by generating a log count based on the number of determined individual log end boundaries identified from the load end face scan, and wherein the generated output data representing the log load comprises the log count representing the number of logs in the log load.

In an embodiment, the handheld scanner unit is configured to operate the depth and texture sensors to capture the depth images and texture images simultaneously in pairs as the scanner unit is scanned over the entire load end face during a scan. In another embodiment, the handheld scanner unit is configured to operate the depth and texture sensors such that at least some of the depth and texture images captured in the scan are in pairs simultaneously captured at the same instant in time, for example based on a common trigger signal to the depth and texture sensors. In another embodiment, the series of depth and texture images may be captured independently of each other, at the same or different frame rates.

In an embodiment, each depth image and texture image captures a portion of the load end face. In one form, the field of view of the depth and texture sensors captures only a portion of the total load end face for each pair of depth and texture images when operated at a predetermined stand-off distance from the load end face. In this embodiment, the series of pairs of depth and texture images collectively capture the entire load end face at the completion of the scan.

In an embodiment, the depth sensor of the handheld scanner unit is a depth camera. In one form, the depth sensor comprises a filter to reduce noise. In one example, the depth camera operates at infra-red frequencies, and the filter is an infrared (IR) filter. In other forms, the depth sensor does not employ any filter.

In another embodiment, the depth sensor of the handheld scanner unit is a stereo camera.

In an embodiment, the texture sensor of the handheld scanner unit is a texture camera. In one form the texture camera is a monochrome camera. In this form, the monochrome camera may be provided with a colour filter or filters configured to enhance the texture image for determining the wood-bark boundary of the log ends. The properties of the colour filter may be log species dependent. In other forms, the monochrome camera does not employ any colour filter or filters. In another form, the texture camera is a colour camera.

In an embodiment, the handheld scanner unit comprises a handle or handle assembly for gripping by a hand or hands of a user. In this embodiment, the depth camera and texture camera are mounted to or carried by the handle or handle assembly.

In an embodiment, the handheld scanner unit comprises an operable trigger button that is operable by a user to commence and cease a scan by generating actuation signals in response to actuation of the trigger button that initiates capture of the depth and texture images as the handheld scanner unit is scanned over the load end face and then halts the image capture at the completion of the scan.

In an embodiment, the system further comprises an operator interface device having a display screen that is operatively connected to the handheld scanner unit and which is configured to display scan feedback to the user. In one form, the scan feedback displayed on the display screen is a real-time visualization of the depth and/or texture images being captured or in the field of view of the depth and texture cameras. In another form, the scan feedback is a real-time visualization of the data model of the load end face being generated during the scan.

In an embodiment, the handheld scanner unit further comprises a controller. In one form, the controller is a separate device that is operatively connected to the handheld scanner unit. In another form, the controller is integrated with the handheld scanner unit.

In an embodiment, the controller of the handheld scanner unit is operatively connected to at least the depth and texture cameras, and which is operable to control the depth and texture cameras. In one example, the controller is further configured to compress the captured depth and texture images generated by the cameras for transmission to the data processor or processors.

In an embodiment, the handheld scanner unit further comprises an operable trigger button that is operable by a user to generate trigger button actuation signals to commence and cease a scan, the controller of the handheld scanner unit being further operatively connected to trigger button, and which receives and processes the trigger button actuation signals and operates the depth and texture cameras to either initiate or halt capture for a scan based on the trigger button actuation signals.

In an embodiment, the handheld scanner unit further comprises an inertial sensor configured to detect movement and/or position of the handheld scanner unit and generate representative movement signals, and wherein the controller of the handheld scanner unit is further operatively connected to the inertial sensor and is configured to receive and transmit the generated movement signals to the data processor or processors. In one form, the inertial sensor is a 3-axis accelerometer that is configured to generate movement signals in the form of accelerometer signals or values during the scan.

In an embodiment, the handheld scanner unit is a separate device to the data processor or processors. In this embodiment, the handheld scanner unit is configured to communicate with the data processor over a data link, which may be wired or wireless. In one form, the handheld scanner unit is configured with a communications module that is configured to transmit the scan data (e.g. depth images, texture images, accelerometer signals) to the data processor or processor over a wireless data link. The scan data may be transmitted or streamed to the data processor or processors in real-time as it is acquired, or in bulk at the end of the scan.

In an embodiment, the depth and texture cameras are synchronised such that each pair of depth and texture images in the set or series acquired at a respective instant in time during the scan. In an embodiment, the number of pairs of successive depth and texture image pairs acquired during a scan is dependent on a configurable frame rate of the cameras and the scanning time as determined by the operator during the scan.

In an embodiment, the handheld scanner unit is configured to be held by an operator at a predetermined stand-off distance or range from the load end face being scanned. In one configuration, the stand-off distance may be approximately 1.5 m to approximately 2 m from the load end face, but in alternative configurations the stand-off distance may be closer or further away.

In an embodiment, the ID elements on each log are machine-readable printed code, each machine-readable printed code comprising an encoded unique log ID data or code that is assigned to its respective log. In one form, the ID elements are ID tags in the form of printed barcodes or QR codes that are affixed to the log end face of each log in the log load. In one form, the ID tags may be in the form of printed sheets applied to the log ends.

In an embodiment, the data processor or processors are configured to decompress the depth and texture images received from the handheld scanner unit into their original decompressed depth and texture images.

In an embodiment, the data processor or processors are configured to process the texture images to identify and decode any ID elements visible in the scanned load end face by processing each texture image to identify visible ID elements, decoding each of the visible ID elements to extract their respective unique log ID codes, and generating and storing a data file comprising the unique log ID codes extracted in relation to each texture image, along with the positional co-ordinates of the ID elements in each respective texture image. In an embodiment, the data processor or processors are further configured to generate and store a data file comprising each unique log ID code extracted from the processing of the set of texture images, and the number of times each unique log ID code was seen in the set of texture images.

In an embodiment, the data processor or processors are configured to fuse the depth images, or depth and texture images, into a data model of the load end face by:

processing the depth images, or depth images and texture images, to estimate the pose of the handheld scanner unit at each depth image, or depth image and texture image, captured and generating pose estimate data associated with each depth image, or depth image and texture image; and processing the depth images, or depth images and texture images, and pose estimate data into a data model in the form of a spatial data structure.

In an embodiment, the pose estimates are generated from the depth images, or depth images and texture images, by executing a pose estimation algorithm that performs a 3D self-registration to estimate the pose of the scanner handheld unit for each depth image, or depth image and texture image. In one form, the pose estimation algorithm executes a point-plane error function to generate the pose estimates.

In an embodiment, the depth images, or depth images and texture images, are fused into a data model in the form of a truncated signed distance function (TSDF) based on the pose estimate data.

In an embodiment, the data processor or processors are configured to fuse the depth images into a data model of the load end face by:

processing the depth images to estimate the pose of the handheld scanner unit at each depth image captured and generating pose estimate data associated with each depth image; and processing the depth images and pose estimate data into a data model in the form of a spatial data structure.

In an embodiment, the pose estimates are generated from the depth images by executing a pose estimation algorithm that performs a 3D self-registration to estimate the pose of the scanner handheld unit for each depth image. In one form, the pose estimation algorithm executes a point-plane error function to generate the pose estimates.

In an embodiment, the depth images are fused into a data model in the form of a truncated signed distance function (TSDF) based on the pose estimate data.

In an embodiment, the data processor or processors are configured to generate the log end boundaries of the individual logs visible in the load end face by processing the data model to generate a raycast orthographic depth image normal to the load end face, and extracting the log end boundaries from the raycast orthographic depth image. In one form, the handheld scanner unit further comprises an inertial sensor that is configured to detect movement and/or position of the handheld scanner unit and generate representative movement signals, and wherein generating the raycast orthographic depth image comprises determining the downward and normal directions of the load end face based on the movement signals and the data model (e.g. TSDF). In one example, the intertial sensor is a 3-axis accelerometer generating accelerometer signals.

In an embodiment, the data processor or processors is further configured to generate a raycast orthographic normal image of the load end face. In one form, the data processor or processors are configured to image process the raycast orthographic depth image based on the raycast orthographic normal image to generate a cleaner raycast orthographic depth image that removes non-log features and/or sides of logs or similar, and the cleaned raycast orthographic depth image is processed to determine the log end boundaries.

In an embodiment, the log end boundaries determined from the raycast orthographic depth image are further refined by the data processor or processors. In one form, the data processor or processors are configured to transform and project the determined log end boundaries onto one or more of the captured texture images, and processing of the texture images in the region of the projected log end boundaries to detect the wood-bark boundary. In one form, the processing executes a segmentation algorithm that is configured to process the texture images to detect the wood-bark boundary interface for each log and adjust the projected log end boundary to the detected wood-bark boundary to generate a refined under-bark log end boundary for each log.

In an embodiment, the data processor or processors are configured to generate the log end boundaries of the individual logs visible in the load end face by processing the data model to generate one or more raycast images, and extracting the log end boundaries from the raycast images. In one form, the handheld scanner unit further comprises an inertial sensor that is configured to detect movement and/or position of the handheld scanner unit and generate representative movement signals, and wherein generating the one or more raycast images comprises determining the downward and normal directions of the load end face based on the movement signals and the data model.

In an embodiment, the one or more raycast images comprise a raycast depth image, and wherein the data processor or processors are further configured to generate a raycast normal image of the load end face, and then further image process the raycast depth image based on the raycast normal image to generate a cleaned raycast depth image that removes non-log features and/or sides of logs, and the cleaned raycast depth image is processed to determine the log end boundaries.

In an embodiment, the log end boundaries determined from the one or more raycast images are further refined by the data processor or processors by transforming and projecting the determined log end boundaries onto one or more of the captured texture images, and processing of the texture images in the region of the projected log end boundaries to detect the wood-bark boundary by executing a segmentation algorithm that is configured to process the texture images to detect the wood-bark boundary interface for each log and adjust the projected log end boundary to the detected wood-bark boundary to generate a refined under-bark log end boundary for each log.

In some embodiments, the raycast images may be orthographic or not, and their individual elements (pixels) may comprise any one or more of the following: depth values, normal values, bit patterns representing voxel occupancy, or the like.

In an embodiment, the data processor or processors are configured to generate an inner statistical boundary within which no bark is expected for each of the logs, and the segmentation algorithm is restricted to processing only the annular regions of the texture images located between the projected determined (outer) log end boundary and the inner statistical boundary, for each log end. In one form, the statistical boundary is generated based on statistical data stored representing the maximum bark thickness expected for the species of log being scanned.

In an embodiment, the data processor or processors are configured to generate output data by measuring one or more physical properties of the log ends based on determined or refined log end boundaries to generate representative log end boundary data for each log and then generate output data representing the log load comprising the log end boundary data for each log, and wherein the data processor or processors are configured to measure the physical properties of the log ends by:
- calculating the planes associated with each log end face and projecting the determined or refined log end boundaries onto their respective calculated log end planes,
- transforming the log end boundaries and planes into a metric world coordinate system, and
- measuring one or more physical properties of the log ends based on the transformed log end boundaries.

In one form, the physical properties of each log end may comprise any one or more of the following: log end boundary centroid, minor axis, orthogonal axis and log diameters along the determined axes.

In an embodiment, the data processor or processors are configured to generate a link or association between the extracted individual log ID data and its respective log end boundary data by triangulating the ID element centers based on the texture images to detect which ID element corresponds to which log end boundary and its associated log end boundary data, and generating output data representing the log load that comprises the generated link or association representing this correspondence.

In an embodiment, the data processor or processors are further configured to output and/or store output data representing the log load in a data file or memory. In one example, the output data may comprise the log ID data and a log count. The log count may be based on the number of individual log end boundaries identified from the scan, for example. In another example, the output data may comprise the log ID data, the measured log end boundary data, and the link or association between the log ID data and measured log end boundary data. In another example, the output data may comprise the log ID data, the log count, the measured log end boundary data, and the link or association between the log ID data and measured log end boundary data.

In one form, the output data may be stored in a data file or memory. In another form, the output data may be displayed on a display screen. In another form, the output data is in the form of a table and/or diagrammatic report.

In an embodiment, the log load is in situ on a transport vehicle when scanned by the handheld scanner unit. The transport vehicle may be, for example, a logging truck or trailer, railway wagon, or log loader. In another embodiment, the log load may be resting on the ground or another surface, such as a log cradle for example.

In an embodiment, the ID elements are provided on only the small end of each of the logs in the log load.

In an embodiment, where the log load comprises all small ends of the logs at the same load end face, the system is configured to process data from only the scan of the load end face comprising the small ends. In another embodiment, where the log load comprises small ends of the logs mixed between both ends of the log load, the system is configured to receive and process data from two separate scans, one scan of each load end face of the log load, and combine or merge the output data from both scans.

In an embodiment, the log scanning system further comprises an operable powered carrier system to which the handheld scanner unit is mounted or carried, and wherein the carrier system is configured to move the handheld scanner unit relative to the log load to scan the load end face either automatically or in response to manual control by an operator.

In an embodiment, the data processor or processors are configured to fuse the depth images or the depth images and texture images into the data model of the load end face.

In a second aspect, the invention broadly consists in a method of identifying and measuring a load of logs (log load), each individual log in the log load comprising an ID element comprising unique log ID data on at least one log end face, the method comprising:
- scanning a load end face of the log load with a handheld scanner unit comprising a depth sensor and texture sensor to acquire a series of depth images and texture images of the load end face;
- fusing the depth images into a data model of the load end face;
- determining log end boundaries of the individual logs visible in the load end face by processing the data model;
- processing the texture images to identify and decode any ID elements visible in the scanned load end face to extract the individual log ID data for individual logs in the log load; and
- generating output data representing the log load based on the determined log end boundaries and extracted log ID data.

In an embodiment, generating the output data comprises measuring one or more physical properties of the log ends based on the determined log end boundaries to generate representative log end boundary data for each log, and wherein the generated output data representing the log load comprises the log end boundary data for each log.

In an embodiment, the method further comprising generating a link or association between the generated individual log ID data and its respective log end boundary data, and wherein the generated output data representing the log load comprises the link or association between the individual log ID data and its respective log end boundary data.

In an embodiment, generating the output data comprises generating a log count based on the number of determined individual log end boundaries identified from the load end face scan, and wherein the generated output data representing the log load comprise the log count representing the number of logs in the log load.

In an embodiment, the method further comprises generating output data comprising a log count. In one form, the method comprises generating the log count based on the number of individual log end boundaries identified from the scan. In another form, the method comprises generating the log count based on the number of individual ID elements identified from the scan.

In an embodiment, scanning the load end face comprises operating or configuring the handheld scanner unit to capture the depth images and texture images simultaneously in pairs as the scanner unit is scanned over the entire load end face during a scan. In another embodiment, the method comprises operating or configuring the handheld scanner unit to operate the depth and texture sensors such that at least some of the depth and texture images captured in the scan are in pairs simultaneously captured at the same instant in time, for example based on a common trigger signal. In another embodiment, the method comprises operating or configuring the handheld scanner unit to capture the series of depth and texture images independently of each other, at the same or different frame rates.

In an embodiment, scanning the load end face comprises operating the handheld scanner such that the field of view of the depth and texture sensors captures only a portion of the total load end face for each pair of depth and texture images and moving the handheld scanner unit relative to the load end face such that the series of pairs of captured depth and texture images collectively capture the entire load end face at the completion of the scan.

In an embodiment, processing the texture images to identify and decode any ID elements visible in the scanned load end face comprises processing each texture image to identify visible ID elements, decoding each visible ID element to extract its unique log ID code, and generating and storing a data file comprising the unique log ID codes extracted in relation to each texture image, along with the positional co-ordinates of the ID elements in each respective texture image.

In an embodiment, the method further comprises generating and storing a data file comprising each unique log ID code extracted from the processing of the set of texture images, and the number of times each unique log ID code was seen in the set of texture images.

In an embodiment, fusing the depth images, or depth images and texture images, into a data model of the load end face comprises:
  processing the depth images, or depth images and texture images, to estimate the pose of the handheld scanner unit at each depth image, or depth image and texture image, captured and generating pose estimate data associated with each depth image, or depth image and texture image; and
  processing the depth images, or depth images and texture images, and pose estimate data into a data model in the form of a spatial data structure.

In an embodiment, the method comprises generating the pose estimate data by executing a pose estimation algorithm that performs a 3D self-registration to estimate the pose of the scanner handheld unit for each depth image, or depth image and texture image. In one form, executing the pose estimation algorithm comprises executing a point-plane error function to generate the pose estimates.

In an embodiment, fusing the depth images, or depth images and texture images, into a data model comprises fusing the depth images, or depth images and texture images, into a truncated signed distance function (TSDF) based on the pose estimate data.

In an embodiment, fusing the depth images into a data model of the load end face comprises:
  processing the depth images to estimate the pose of the handheld scanner unit at each depth image captured and generating pose estimate data associated with each depth image; and
  processing the depth images and pose estimate data into a data model in the form of a spatial data structure.

In an embodiment, the method comprises generating the pose estimate data by executing a pose estimation algorithm that performs a 3D self-registration to estimate the pose of the scanner handheld unit for each depth image. In one form, executing the pose estimation algorithm comprises executing a point-plane error function to generate the pose estimates.

In an embodiment, fusing the depth images into a data model comprises fusing the depth images into a truncated signed distance function (TSDF) based on the pose estimate data.

In an embodiment, determining log end boundaries of the individual logs visible in the load end face comprises:
  processing the data model to generate a raycast orthographic depth image normal to the load end face, and
  extracting the log end boundaries from the raycast orthographic depth image.

In an embodiment, the method further comprises measuring inertial movements of the handheld scanner unit with an inertial sensor and generating representative inertial signals, and generating the raycast orthographic depth image comprises determining the downward and normal directions of the load end face based on the inertial signals and the data model (e.g. TSDF). In one form, the inertial sensor is a 3-axis accelerometer that generates representative accelerometer signals.

In an embodiment, the method further comprises generating a raycast orthographic normal image of the load end face. In one form, the method further comprises processing the raycast orthographic depth image based on the raycast orthographic normal image to generate a cleaner raycast orthographic depth image that removes non-log features and/or sides of logs or similar, and processing the cleaned orthographic depth image to determine the log end boundaries.

In an embodiment, the method comprises refining the log end boundaries determined from the raycast orthographic depth image by transforming and projecting the determined log end boundaries onto one or more of the captured texture images, and processing of the texture images in the region of the projected log end boundaries to detect the wood-bark boundary. In one form, processing of the texture images comprises executing a segmentation algorithm that is configured to process the texture images to detect the wood-bark boundary interface for each log and adjust the projected log end boundary to the detected wood-bark boundary to generate a refined under-bark log end boundary for each log.

In an embodiment, determining log end boundaries of the individual logs visible in the load end face comprises:
  processing the data model to generate one or more raycast images, and
  extracting the log end boundaries from the one or more raycast images.

In an embodiment, the method further comprising measuring inertial movements of the handheld scanner unit with an inertial sensor and generating representative inertial signals, and generating the one or more raycast images comprises determining the downward and normal directions of the load end face based on the inertial signals and the data model.

In an embodiment, the one or more raycast images comprise a raycast depth image, and wherein the method further comprises generating a raycast normal image of the load end face, and processing the raycast depth image based on the raycast normal image to generate a cleaned raycast depth image that removes non-log features and/or sides of logs, and processing the cleaned raycast depth image to determine the log end boundaries.

In an embodiment, the method comprises refining the log end boundaries determined from the one or more raycast images by transforming and projecting the determined log end boundaries onto one or more of the captured texture images, and processing of the texture images in the region of the projected log end boundaries to detect the wood-bark boundary by processing of the texture images comprises executing a segmentation algorithm that is configured to process the texture images to detect the wood-bark boundary interface for each log and adjust the projected log end boundary to the detected wood-bark boundary to generate a refined under-bark log end boundary for each log.

In an embodiment, the method further comprises generating an inner statistical boundary within which no bark is expected for each of the logs, and restricting execution of the segmentation algorithm to the annular regions of the texture images located between the projected determined (outer) log end boundary and the inner statistical boundary, for each log end. In one form, generating the inner statistical boundary comprises generating the inner statistical boundary based on statistical data stored representing the maximum bark thickness expected for the species of log being scanned.

In an embodiment, generating output data comprises measuring one or more physical properties of the log ends based on the determined or refined log end boundaries to generate representative log end boundary data for each log and the generated output data representing the log load comprises the log end boundary data for each log, and wherein measuring physical properties of the log ends based on the determined log end boundaries to generate representative log end boundary data for each log comprises:
- calculating the planes associated with each log end face and projecting the determined or refined log end boundaries onto their respective calculated log end planes,
- transforming the log end boundaries and planes into a metric world coordinate system, and
- measuring one or more physical properties of the log ends based on the transformed log end boundaries.

In one form, the physical properties of each log end may comprise any one or more of the following: log end boundary centroid, minor axis, orthogonal axis and log diameters along the determined axes.

In an embodiment, the method further comprises generating a link or association between the generated individual log ID data and its respective log end boundary data by triangulating the center of the ID elements based on the texture images to detect which ID element corresponds to which log end boundary and its associated log end boundary data, and generating output data representing the log load that comprises the generated link or association representing this correspondence.

In an embodiment, the method further comprises outputting or storing output data representing the extracted individual log ID data and corresponding measured log end boundary data.

In an embodiment, the method comprises storing the output data in a data file or memory.

In an embodiment, the method comprises displaying the output data on a display screen.

In an embodiment, the method comprises storing or displaying the output data in the form of a table and/or diagrammatic report.

In one example, the output data may comprise the log ID data and a log count. The log count may be based on the number of individual log end boundaries identified from the scan, for example. In another example, the output data may comprise the log ID data, the measured log end boundary data, and the link or association between the log ID data and measured log end boundary data. In another example, the output data may comprise the log ID data, the log count, the measured log end boundary data, and the link or association between the log ID data and measured log end boundary data.

In an embodiment, the method comprises scanning the load end face of the log load in situ on a transport vehicle. The transport vehicle may be, for example, a logging truck or trailer, railway wagon, or log loader. In another embodiment, the method comprises scanning the load end face of the log load while it is resting on the ground or another surface, such as a log cradle for example.

In an embodiment, the method comprises fixing or providing ID elements on only the small end of each of the logs in the log load.

In an embodiment, where the log load comprises all small ends of the logs at the same load end face, the method comprises scanning only the load end face comprising the small ends. In another embodiment, where the log load comprises small ends of the logs mixed between both ends of the log load, the method comprises scanning both load end faces, and combining or merging the output data from both scans.

In an embodiment, the method comprises fusing the depth images or the depth images and texture images into the data model of the load end face.

The second aspect of the invention may comprise any one or more features mentioned in respect of the first aspect of the invention.

In another aspect, the invention broadly consists in a handheld scanner for use in a log identification and measurement system for scanning a load of logs (log load), each individual log in the log load comprising an ID element comprising unique log ID data on at least one log end face, the handheld scanner comprising:
- a depth sensor configured to capture a series of depth images of the load end face during the load end face scan;
- a texture sensor configured to capture a series of texture images of the load end face during the load end face scan; and
- a controller that is configured to output data representing the captured depth and texture images for storage and/or processing.

In one configuration, the depth and texture sensors are configured or operated to capture at least some depth images and texture images simultaneously in pairs at the same instance in time as the scanner is scanned over the entire load end face during a scan.

In another aspect, the invention broadly consists in a data processor system for use in a log identification and measurement system for scanning a load of logs (log load), each individual log in the log load comprising an ID element comprising unique log ID data on at least one log end face, the data processor system configured to:
- receive a series of captured depth and texture images of the load end face;
- fuse the depth images into a data model of the load end face;
- determine log end boundaries of the individual logs visible in the load end face by processing the data model;
- measure physical properties of the log ends based on the determined log end boundaries to generate representative log end boundary data for each log;
- process the texture images to identify and decode any ID elements visible in the scanned load end face to extract individual log ID data for individual logs in the log load; and
- generate a link or association between the generated individual log ID data and its respective log end boundary data.

In one configuration, the series of captured depth and texture images of the load end face comprise at least some pairs of depth and texture images that are captured simultaneously at the same instance in time.

In another aspect, the invention broadly consists in a method of identifying and measuring a load of logs (log load), each individual log in the log load comprising an ID element comprising unique log ID data on at least one log end face, the method comprising:
  receiving a series of captured depth and texture images of the load end face;
  fusing the depth images into a data model of the load end face;
  determining log end boundaries of the individual logs visible in the load end face by processing the data model;
  measuring physical properties of the log ends based on the determined log end boundaries to generate representative log end boundary data for each log;
  processing the texture images to identify and decode any ID elements visible in the scanned load end face to extract the individual log ID data for individual logs in the log load; and
  generating a link or association between the generated individual log ID data and its respective log end boundary data.

In one configuration, the series of captured depth and texture images of the load end face comprise at least some pairs of depth and texture images that are captured simultaneously at the same instance in time.

In another aspect, the invention broadly consists in a log scanning system for scanning a load of logs (log load), the system comprising:
  a handheld scanner unit for free-form scanning by an operator over a load end face of the log load, the scanner unit comprising:
    a depth sensor configured to capture a series of depth images of the load end face during the load end face scan, and
    a texture sensor configured to capture a series of texture images of the load end face during the load end face scan; and
  a data processor or processors that receive the series of depth images and texture images captured from each scan, and which are configured to:
    process the depth and/or texture images to determine one or more physical properties of the log ends of each of the individual logs; and
    generate output data for the log load representing the determined one or more physical properties.

In one configuration, each individual log in the log load comprising an ID element comprising unique log ID data on at least one log end face, and the system further comprises processing the depth and/or texture images to extract the individual log ID data for individual logs. In this configuration, the system may be configured to generate output data representing the extracted log ID data and their respective determined one or more physical properties.

In another aspect, the invention broadly consists in a method of scanning a load of logs (log load), the method comprising:
  scanning a load end face of the log load with a handheld scanner unit comprising a depth sensor and texture sensor to acquire a series of depth images and texture images of the load end face;
  processing the depth and/or texture images to determine one or more physical properties of the log ends of each individual logs; and
  generating output data for the log load representing the determined one or more physical properties.

In one configuration, each individual log in the log load comprising an ID element comprising unique log ID data on at least one log end face, and the method further comprises extracting the individual log ID data for individual logs based on the depth and/or texture images. In this configuration, the method may further comprise outputting data representing the extracted log ID data and their respective determined one or more physical properties.

In another aspect, the invention broadly consists in a log scanning system for scanning a load of logs (log load), the system comprising:
  a moveable scanner unit for scanning over a load end face of the log load, the scanner unit comprising:
    a depth sensor configured to capture one or more depth images of the load end face during the load end face scan, and
    a texture sensor configured to capture one or more texture images of the load end face during the load end face scan; and
  a data processor or processors that receive the series of depth images and texture images captured from each scan, and which are configured to process the depth and/or texture images to generate output data representing one or more characteristics of the log load.

In an embodiment, the characteristics may be any one or more of the following: a log count, log end boundary data for the individual logs representing one or more physical characteristics of the log, and log ID data to identify the individual logs in the log load.

In an embodiment, the scanner unit is handheld for scanning over the load end face by an operator. In another embodiment, the scanner unit is mounted to or carried by an operable powered carrier system that is configured to move the scanner unit relative to the log load to scan the load end face either automatically or in response to manual control by an operator.

In another aspect, the invention broadly consists in a method of scanning a load of logs (log load), the method comprising:
  scanning a load end face of the log load with a moveable scanner unit comprising a depth sensor and texture sensor to acquire a series of depth images and texture images of the load end face;
  processing the depth and/or texture images to generate output data representing one or more characteristics of the log load.

In an embodiment, the characteristics may be any one or more of the following: a log count, log end boundary data for the individual logs representing one or more physical characteristics of the log, and log ID data to identify the individual logs in the log load.

In another aspect, the invention broadly consists in a log identification and measurement system for scanning a load of logs (log load), each individual log in the log load comprising an ID element comprising unique log ID data on at least one log end face, the system comprising:
  a handheld scanner unit for free-form scanning by an operator over a load end face of the log load, the scanner unit comprising:
    a depth sensor configured to capture a series of depth images of the load end face during the load end face scan, and a texture sensor configured to capture a series of texture images of the load end face during the load end face scan; and a data processor or processors that receives the series of depth images and texture images captured from the scan, and which are configured to:

fuse the depth images into a data model of the load end face;

determine log end boundaries of the individual logs visible in the load end face by processing the data model;

measure physical properties of the log ends based on the determined log end boundaries to generate representative log end boundary data for each log;

process the texture images to identify and decode any ID elements visible in the scanned load end face to extract individual log ID data for individual logs in the log load; and generate a link or association between the generated individual log ID data and its respective log end boundary data.

In an embodiment, the data processor or processors are further configured to generate output data representing the log load comprising the log end boundary data, the log ID data, and the link or association between the generated individual log ID data and its respective log end boundary data.

In an embodiment, the data processor or processors are further configured to generate a log count based on the number of determined individual log end boundaries identified from the load end face scan, and the output data further comprises the log count.

In another aspect, the invention broadly consists in a method of identifying and measuring a load of logs (log load), each individual log in the log load comprising an ID element comprising unique log ID data on at least one log end face, the method comprising:

scanning a load end face of the log load with a handheld scanner unit comprising a depth sensor and texture sensor to acquire a series of depth images and texture images of the load end face;

fusing the depth images into a data model of the load end face;

determining log end boundaries of the individual logs visible in the load end face by processing the data model;

measuring physical properties of the log ends based on the determined log end boundaries to generate representative log end boundary data for each log;

processing the texture images to identify and decode any ID elements visible in the scanned load end face to extract the individual log ID data for individual logs in the log load; and generating a link or association between the generated individual log ID data and its respective log end boundary data.

In an embodiment, the method further comprises generating output data representing the log load comprising the log end boundary data, the log ID data, and the link or association between the generated individual log ID data and its respective log end boundary data.

In an embodiment, the method further comprises generating a log count based on the number of determined individual log end boundaries identified from the load end face scan, and the output data further comprises the log count.

In another aspect, the invention broadly consists in a log identification and counting system for scanning a load of logs (log load), each individual log in the log load comprising an ID element comprising unique log ID data on at least one log end face, the system comprising:

a handheld scanner unit for free-form scanning by an operator over a load end face of the log load, the scanner unit comprising:

a depth sensor configured to capture a series of depth images of the load end face during the load end face scan, and a texture sensor configured to capture a series of texture images of the load end face during the load end face scan; and a data processor or processors that receives the series of depth images and texture images captured from the scan, and which are configured to:

fuse the depth images into a data model of the load end face;

determine log end boundaries of the individual logs visible in the load end face by processing the data model;

generate a log count based on the number of determined individual log end boundaries identified from the load end face scan;

process the texture images to identify and decode any ID elements visible in the scanned load end face to extract individual log ID data for individual logs in the log load; and generate output data representing the log load comprising the log count and the log ID data.

In an embodiment, the data processor or processors are further configured to measure one or more physical properties of the log ends based on the determined log end boundaries to generate representative log end boundary data for each log, and generate a link or association between the generated individual log ID data and its respective log end boundary data, and wherein the generated output data representing the log load further comprises the log end boundary data, and the link or association between the individual log ID data and its respective log end boundary data.

In another aspect, the invention broadly consists in a method of identifying and counting a load of logs (log load), each individual log in the log load comprising an ID element comprising unique log ID data on at least one log end face, the method comprising:

scanning a load end face of the log load with a handheld scanner unit comprising a depth sensor and texture sensor to acquire a series of depth images and texture images of the load end face;

fusing the depth images into a data model of the load end face;

determining log end boundaries of the individual logs visible in the load end face by processing the data model;

generating a log count based on the number of determined individual log end boundaries identified from the load end face scan;

processing the texture images to identify and decode any ID elements visible in the scanned load end face to extract the individual log ID data for individual logs in the log load; and generating output data representing the log load comprising the log count and the log ID data.

In an embodiment, the method further comprises measuring physical properties of the log ends based on the determined log end boundaries to generate representative log end boundary data for each log, generating a link or association between the generated individual log ID data and its respective log end boundary data, and generating output data representing the log load further comprising the log end boundary data, and the link or association between the individual log ID data and its respective log end boundary data.

In another aspect, the invention broadly consists in a log counting system for scanning a load of logs (log load), the system comprising:
- a handheld scanner unit for free-form scanning by an operator over a load end face of the log load, the scanner unit comprising a depth sensor configured to capture a series of depth images of the load end face during the load end face scan; and
- a data processor or processors that receives the series of depth images captured from the scan, and which are configured to:
  - fuse the depth images into a data model of the load end face;
  - determine log end boundaries of the individual logs visible in the load end face by processing the data model;
  - generate a log count based on the number of determined individual log end boundaries identified from the load end face scan; and
  - generate output data representing the log load comprising the log count.

In another aspect, the invention broadly consists in a method of counting a load of logs (log load), the method comprising:
- scanning a load end face of the log load with a handheld scanner unit comprising a depth sensor to acquire a series of depth images of the load end face;
- fusing the depth images into a data model of the load end face;
- determining log end boundaries of the individual logs visible in the load end face by processing the data model;
- generating a log count based on the number of determined individual log end boundaries identified from the load end face scan; and
- generating output data representing the log load comprising the log count.

In another aspect, the invention broadly consists in a log measurement system for scanning a load of logs (log load), the system comprising:
- a handheld scanner unit for free-form scanning by an operator over a load end face of the log load, the scanner unit comprising a depth sensor configured to capture a series of depth images of the load end face during the load end face scan; and
- a data processor or processors that receives the series of depth images captured from the scan, and which are configured to:
  - fuse the depth images into a data model of the load end face;
  - determine log end boundaries of the individual logs visible in the load end face by processing the data model;
  - measure physical properties of the log ends based on the determined log end boundaries to generate representative log end boundary data for each log; and
  - generate output data representing the log load comprising the log end boundary data.

In another aspect, the invention broadly consists in a method of measuring a load of logs (log load), the method comprising:
- scanning a load end face of the log load with a handheld scanner unit comprising a depth sensor to acquire a series of depth images of the load end face;
- fusing the depth images into a data model of the load end face;
- determining log end boundaries of the individual logs visible in the load end face by processing the data model;
- measuring physical properties of the log ends based on the determined log end boundaries to generate representative log end boundary data for each log; and
- generating output data representing the log load comprising the log end boundary data.

In another aspect, the invention broadly consists in a computer-readable medium having stored thereon computer executable instructions that, when executed on a processing device, cause the processing device to perform a method of any of the above aspects of the invention.

Each aspect of the invention above may comprise any one or more of the features mentioned in respect of any of the other aspects of the invention.

DEFINITIONS

The phrase "machine-readable code" as used in this specification and claims is intended to mean, unless the context suggests otherwise, any form of visual or graphical code that represents or has embedded or encoded information such as a barcode whether a linear one-dimensional barcode or a matrix type two-dimensional barcode such as a Quick Response (QR) code, a three-dimensional code, or any other code that may be scanned, such as by image capture and processing.

The term "pose" as used in this specification and claims is intended to mean, unless the context suggests otherwise, the location and orientation in space relative to a coordinate system.

The phrase "log load" as used in this specification and claims is intended to mean, unless the context suggests otherwise, any pile, bundle, or stack of logs or trunks of trees, whether in situ on a transport vehicle or resting on the ground or other surface in a pile, bundle or stack, and in which the longitudinal axis of each log in the load is extending in substantially the same direction as the other logs such that the log load can be considered as having two opposed load end faces comprising the log ends of each log.

The phrase "load end face" as used in this specification and claims is intended to mean, unless the context suggests otherwise, either end of the log load which comprises the surfaces of the log ends.

The phrase "log end" as used in this specification and claims is intended to mean, unless the context suggests otherwise, the surface or view of a log from either of its ends, which typically comprises a view of showing either end surface of the log, the log end surface typically extending roughly or substantially transverse to the longitudinal axis of the log.

The phrase "wood-bark boundary" as used in this specification and claims is intended to mean, unless the context suggests otherwise, the log end perimeter or periphery boundary between the wood and any bark on the surface or periphery of the wood of the log such as, but not limited to, when viewing the log end.

The phrase "over-bark log end boundary" as used in this specification and claims is intended to mean, unless the context suggests otherwise, the perimeter boundary of the log end that encompasses any bark present at the log end.

The phrase "under-bark log end boundary" as used in this specification and claims is intended to mean, unless the context suggests otherwise, the perimeter boundary of the log end that extends below or underneath any bark present about the perimeter of the log end such that only wood is within the boundary. In most situations, the under-bark log end boundary can be considered to be equivalent to the wood-bark boundary.

The phrase "free-form" as used in this specification and claims in the context of scanning is intended to mean the operator can freely move or manipulate the handheld scanner relative to the load end face when scanning to progressively capture the images of the entire load end face from multiple viewpoints and positions, in a similar manner, for example, to a spray-painting action, but not necessarily limited to this action.

The phrase "computer-readable medium" as used in this specification and claims should be taken to include a single medium or multiple media. Examples of multiple media include a centralised or distributed database and/or associated caches. These multiple media store the one or more sets of computer executable instructions. The term 'computer readable medium' should also be taken to include any medium that is capable of storing, encoding or carrying a set of instructions for execution by a processor of the mobile computing device and that cause the processor to perform any one or more of the methods described herein. The computer-readable medium is also capable of storing, encoding or carrying data structures used by or associated with these sets of instructions. The phrase "computer-readable medium" includes solid-state memories, optical media and magnetic media.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

Aspects of the systems and methods described below may be operable on any type of general purpose computer system or computing device, including, but not limited to, a desktop, laptop, notebook, tablet or mobile device. The term "mobile device" includes, but is not limited to, a wireless device, a mobile phone, a smart phone, a mobile communication device, a user communication device, personal digital assistant, mobile hand-held computer, a laptop computer, an electronic book reader and reading devices capable of reading electronic contents and/or other types of mobile devices typically carried by individuals and/or having some form of communication capabilities (e.g., wireless, infrared, short-range radio, etc.).

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

1. Overview

The invention relates to a log scanning system for use in the forestry industry. In particular, the system may be used to scan a load or pile of logs (log load) for identifying each of the individual logs in the load based on identification (ID) elements fixed to the log ends, counting the number of logs in the load, and/or measuring or determining individual log characteristics, such as end diameter measurements that can be used to scale logs for commercial purposes, such as export. The system is primarily designed for use at a logging truck processing station or checkpoint, such as at a port or other log processing stations, for scanning a load of logs delivered on a logging truck in situ without needing to remove the logs from the truck. The scan data acquired by the system can be used as part of a log inventory or reporting system for identifying and tracking individual logs, counting logs, and/or for scaling logs to determine volume and value, for example in the context of the log export industry. The system will be described by way of an example with reference to the application of scanning a log load on the back of a logging truck or trailer, although it will be appreciated that the system may also be used to scan log piles situated on ships, rail wagons, log loaders, or other vehicles, or a log pile or load stacked or otherwise resting on the ground or elsewhere, such as a log cradle. The system may be adapted for use either indoors or outdoors.

The embodiment to be described relates to a log scanning system that is configured to scan a log load for log identification, log counting, and log measuring, such as scaling. In particular, in the embodiment to be described, the scan data from the system can be used for identifying individual logs in the load, counting the number of logs in the load, and scaling the logs in the load. However, it will be appreciated that the functionality of the system may be modified or altered depending on the requirements of the system. In a first alternative embodiment, the log scanning system may be configured for log identification and log counting. In a second alternative embodiment, the log scanning system may be configured for log identification and log measuring. In a third alternative embodiment, the log scanning system may be configured for log counting only. In a fourth alternative embodiment, the log scanning system may be configured for log measuring only.

2. System Hardware Overview

Figure 1:
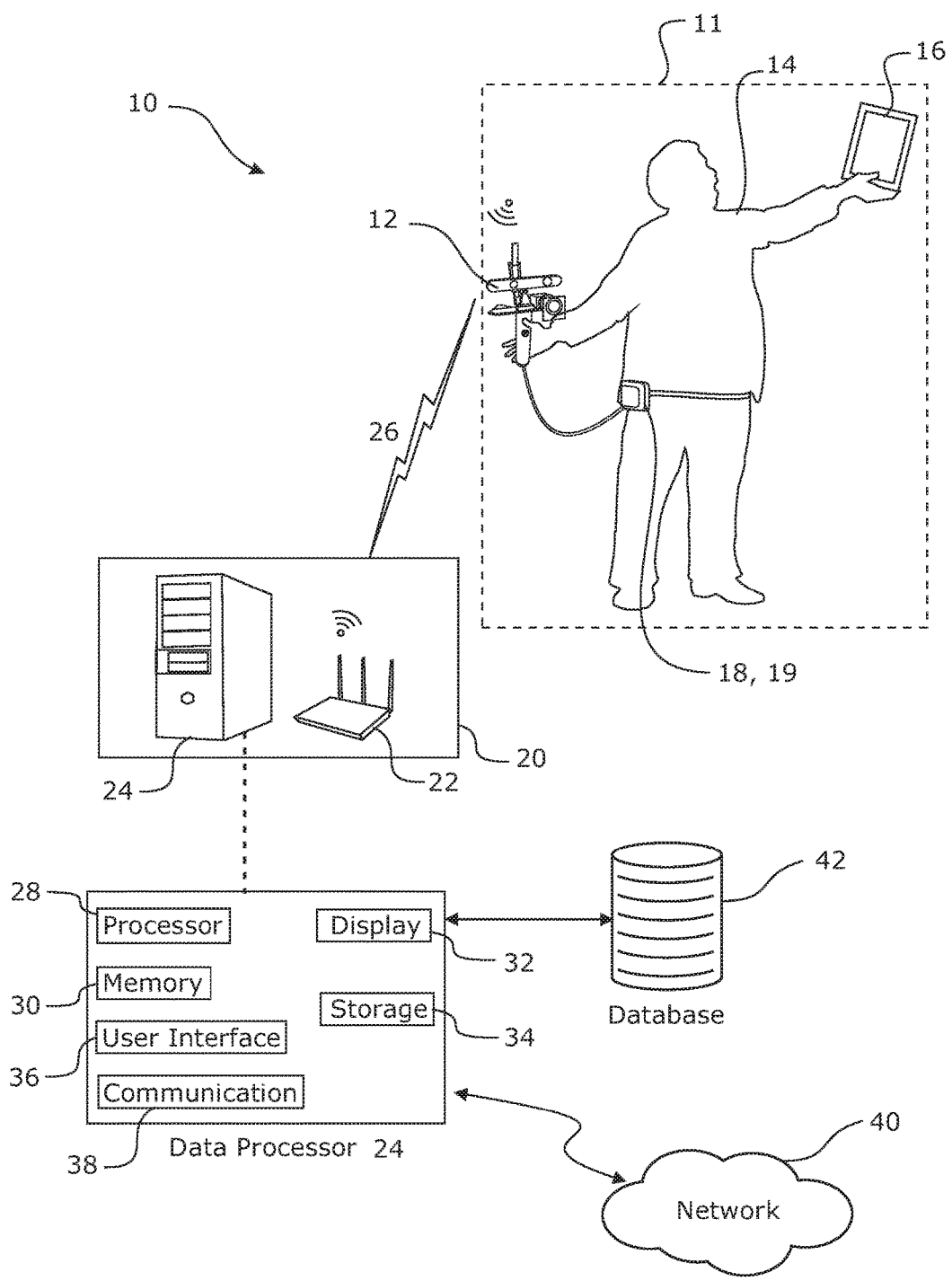
FIG. 1 is a schematic diagram of a log identification and measurement system in accordance with an embodiment of the invention.

Referring to FIGS. 1-6, the main hardware components of an embodiment of the log identification and measurement system 10 will be described in further detail. Referring to FIG. 1, in this embodiment the system 10 comprises a portable scanning system 11 that is in data communication with a data processing system 20. The portable scanning system 11 is configured to be carried and utilised by an operator to scan a load end face of a log load in situ on a logging truck. The portable scanning system 11 comprises a handheld scanner unit 12 that is configured to be held by a hand or hands of an operator 14 for free form scanning of the load end face of a log load. In this embodiment, as will be explained in further detail later, the handheld scanner unit 12 is provided with sensors for acquiring or capturing a series of simultaneous depth images and texture images (depth and texture image pairs) of one or both load end faces of the log load. In this embodiment, the system also comprises a separate operator interface device 16 that comprises a display for displaying a real-time representation of the field of view or depth and texture images being captured by the sensors of handheld scanner unit 12. A scanner controller 18 and power source 19 is hardwired to the handheld scanner unit 12. The scanner controller 18 receives the depth and texture image data streams from the handheld scanner unit 12 and pre-processes these images before they are transmitted wirelessly over a wireless data communication link or network 26 to the data processing system 20.

The data processing system 20 in this embodiment comprises a communication module 22 that is configured to receive the depth and texture image data from the portable scanner system 11. The data processing system also comprises a data processor 24 that is operatively connected to the communications module 22, and which receives the depth and texture image data for further processing and generation of a log load report comprising the identified log IDs of the scanned logs, log count, and log end diameter measurements. The data processor 24 will be explained in further detail later, but may typically comprise a processor 28, memory 30, display 32, data storage 34, user interface 36 and communications modules 38 for connecting to another device and/or network 40, such as the internet or similar. A storage database 42 may also be accessible either directly or indirectly by the data processor 24 for storing output data or load report data files generated by the data processor.

It will be appreciated that the various components in the portable scanning system 11 may be combined or integrated into fewer components or a single component in alternative embodiments, or even further separated into more components if required. Likewise, the components of the data processing system 20 may be integrated or further separated into distant components in alternative embodiments.

Figure 2:
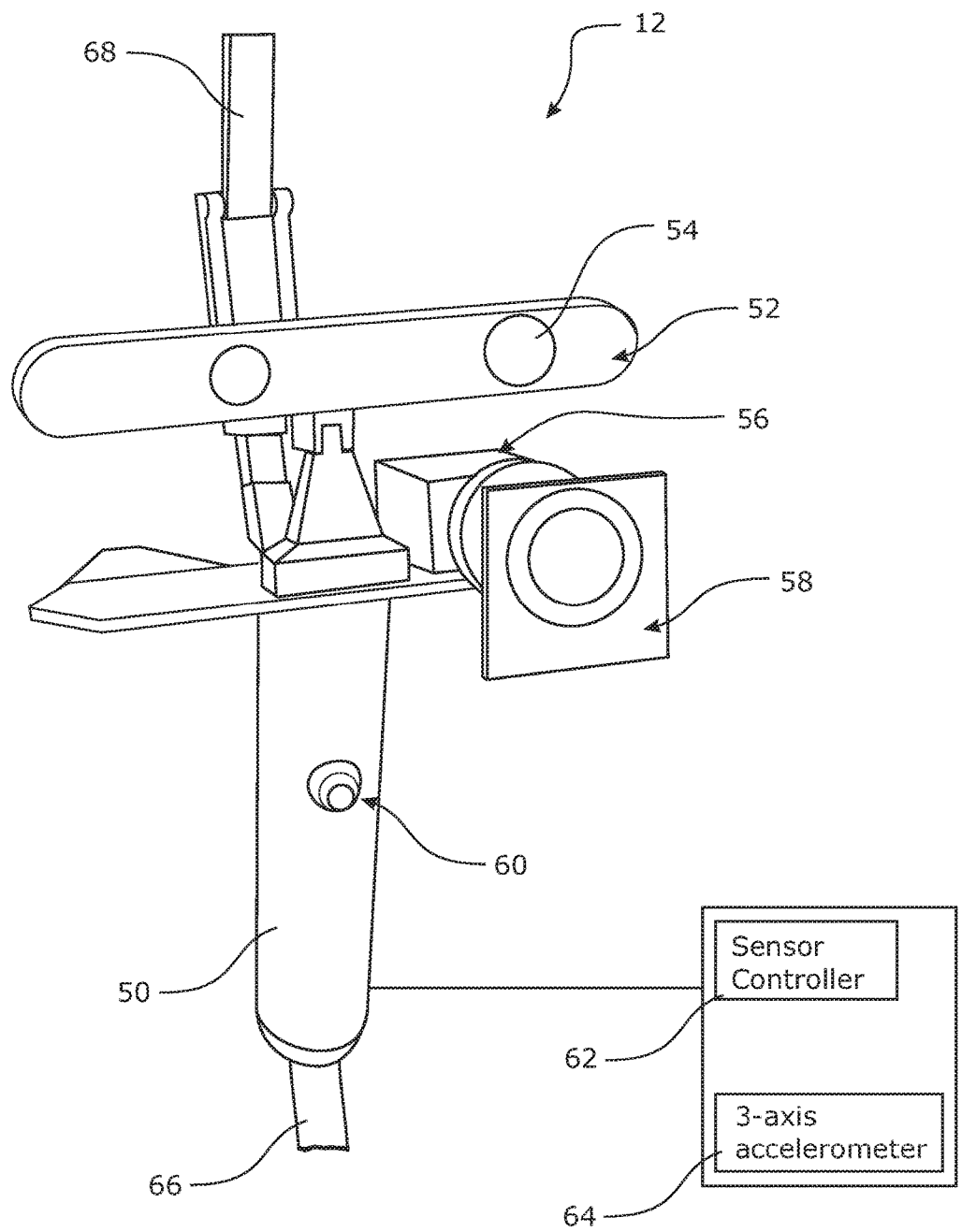
FIG. 2 is a front view of a handheld scanner unit of the system of FIG. 1 in accordance with an embodiment of the invention.

Referring to FIG. 2, an embodiment of the handheld scanner unit 12 is shown. In this embodiment, the handheld scanner unit 12 comprises a main handle 50 for gripping by a hand or hands of a user and which mounts or carries one or more sensors. In this embodiment, the handheld scanner unit 12 comprises a depth sensor 52 that is configured to capture depth images of the load end face of the log load, and a texture sensor 56 that is configured to capture texture images of the load end face. The depth and texture sensors 52, 56 are mounted so as to face the same direction, i.e. they have substantially the same field of view.

In this embodiment, the depth sensor is a depth camera 52 for capturing a series of depth images of the load end face and generating representative depth image data representing the series or set of captured depth images obtained during the scan. In this embodiment, the depth camera is an ASUS XTion Pro Live depth camera, but it will be appreciated that any other alternative depth cameras may alternatively be used such as, but not limited to, a handheld Prime Sense device. In this embodiment, the depth camera utilises an infrared (IR) projector that generates an infrared (IR) pattern at 830 nm. A narrow band-pass IR filter 54 is provided over the depth camera lens to reduce the impact of sunlight on the depth images. It will be appreciated that other depth cameras may alternatively have built-in IR filters, or may be configured to work in the system without any IR filter or otherwise configured to work in the presence of sunlight in alternative embodiments. In other alternative embodiments, depth cameras using different wavelengths may be employed, including those that work at infra-red frequencies or visible light or other frequencies.

It will be appreciated that alternative embodiments may use any other suitable type of depth sensor. For example, in an alternative embodiment the depth sensor may be a stereo camera.

In this embodiment, the texture sensor is a texture camera 56 that is configured to capture a series of texture images of the load end face and generate texture image data representing the series or set of captured texture images obtained during the scan. In this embodiment, the texture camera is a Point Grey Grasshopper 3 monochrome camera, although it will be appreciated that any other suitable texture camera, whether monochrome or colour, may alternatively be used. In this embodiment, a colour filter 58 is provided over the lens of texture camera 56 to enhance the monochrome texture images captured for the subsequent bark-wood boundary segmentation processing of the log end boundaries to be described later. It will be appreciated that alternative texture cameras may be used which have an in-built colour filter or filters. In one example, the colour filter may be a red-cut, blue-boost filter. This is useful for species of log in which the bark is dark and reddish in colour and the red-cut filter makes the bark appear even darker in the monochrome images captured, and hence makes it easier to distinguish from the lighter wood in the segmentation image processing. In cases where log ends have been marked with blue spray paint, the blue-boost aspect of the filter makes the blue spray paint appear lighter in the monochrome image, and in this case makes it almost vanish and not interfere with the segmentation algorithm. It will be appreciated that the exact properties of the colour filter may be altered depending on the species of log being scanned and that the colour filter can be fine-tuned to work for most species and markings. However, it will be appreciated that the colour filter is not essential and the majority of the difference between the wood and bark is in the difference in lightness (intensity). For example, the texture camera may be used without any colour filter or filters in alternative configurations of the system.

In this embodiment, the handheld scanner unit 12 comprises an operable trigger button 60 that is operable to initiate and cease a scan of the load end face of a log load. In particular, the operator actuates or holds down the trigger button 60 on the handle 50 to initiate a scan which commences the capture of the simultaneous depth and texture image pairs of the load end face as it is moved and manipulated by the operator to capture images of the entire load end face from multiple view points and positions. Once the trigger button 60 is released by the operator, the depth and texture image capture ceases and the acquired depth and texture data is sent for processing by the data processing system 20.

In this embodiment, the handheld scanner unit 12 comprises a sensor controller 62 and a three-axis accelerometer mounted within the handle assembly 50. The sensor controller 62 may be a micro-controller or a micro-processor. The sensor controller 62 is operatively connected to the trigger button 60 and controls the operation of the depth and texture cameras 52, 56 in response to actuation (i.e. pressing and releasing) of the trigger button to commence and cease a scan. The sensor controller 62 also reads accelerometer signals sensed and generated by the three-axis accelerometer 64 and is operatively connected to the scanner controller 18, for example via a USB interface or any other hardwired or wireless data connection. The data cable 66 extending from the end of the handle assembly 50 operatively connects the scanner controller 18 to the sensor controller 62, depth camera 52, texture camera 56 and a wireless communication module 68 mounted to the handheld scanner unit 12. In this embodiment, the wireless communication module 68 is a wireless adaptor that is configured to transmit the acquired depth and texture image data acquired during a scan, and the captured accelerometer signals or values, to the data processing system 20 for processing and log load report generation.

Figure 3:
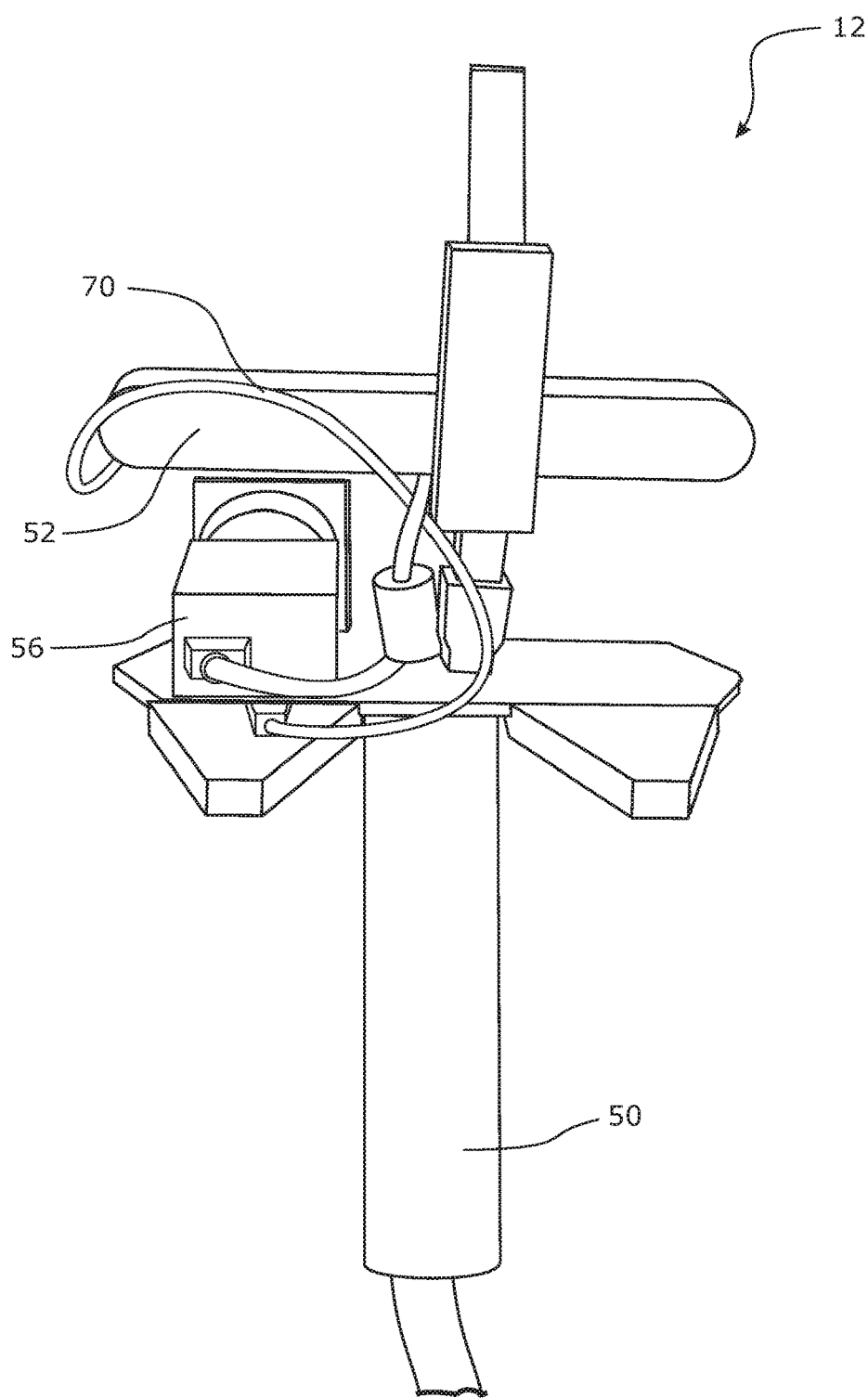
FIG. 3 is a rear view of the handheld scanner unit of FIG. 2.

In this embodiment, the texture camera 56 is synchronised with the depth camera 52 via a synchronisation cable 70 connected between the cameras 52, 56 as shown in FIG. 3. This synchronisation ensures that each pair of depth and texture images is captured in the same instant of time.

Figure 4:
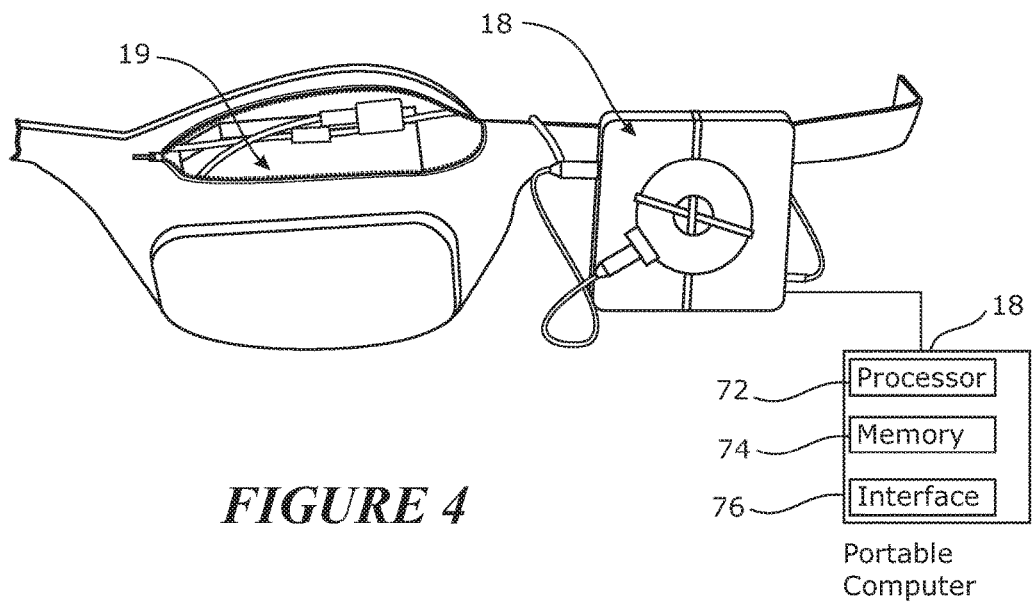
FIG. 4 shows a power supply and scanner controller associated with the handheld scanner unit of the system in accordance with an embodiment of the invention.

Referring to FIG. 4, the scanner controller 18 and battery supply 19 for the portable scanning system 11 is shown. In this embodiment, the scanner controller 18 is in the form of a portable computer such as an Intel NUC device, although it will be appreciated that any other portable computer or controller system could alternatively be used. The portable computer may comprise a processor 72, memory 74 and an interface 76 for operatively connecting to external devices. In this embodiment, a dual power supply is provided on the portable computer 18 such that it may be switched between the battery 19 and mains power supply without turning it off. The main functions of the scanner controller 18 are to implement the 'scan tool' and 'button controller' components, which will be described in further detail later.

Figure 5:
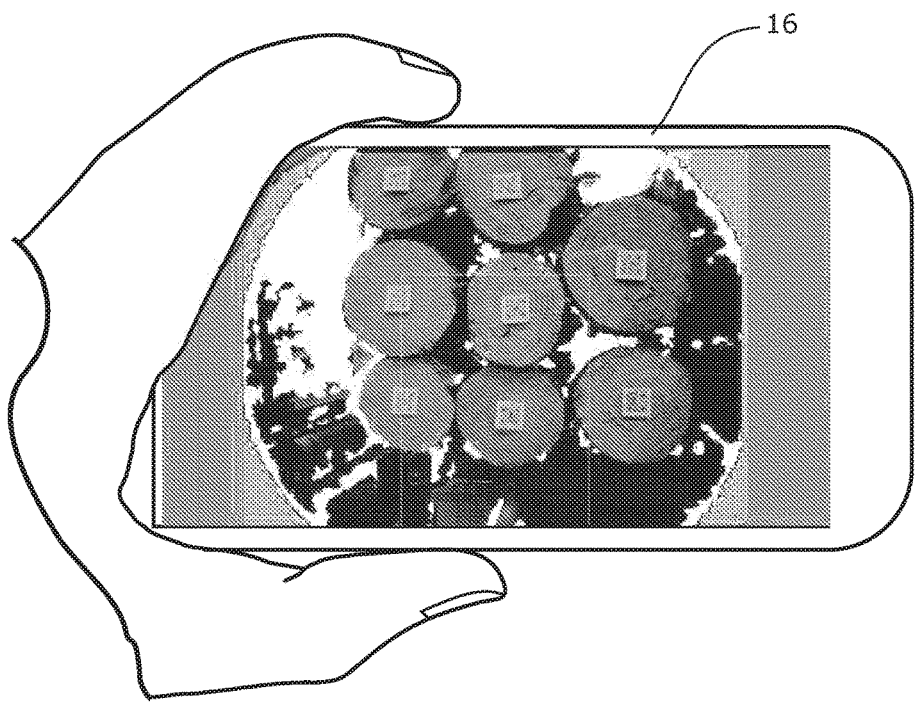
FIG. 5 shows an operator interface device displaying a real-time visual representation of the image data being captured by the handheld scanner unit in accordance with an embodiment of the invention.

Referring to FIG. 5, the operator interface device 16 displaying the operator interface may be implemented on any portable handheld electronic device, such as a smartphone tablet, portable digital assistant (PDA) or any other mobile computer device having a display or any other suitable portable electronic display device. In this embodiment, the operator interface device 16 is a smartphone that is operatively connected to the scanner controller 18 via a USB link or cable or any other suitable hardwired or wireless data connection or link. As will be explained in further detail later, the operator interface device is configured to receive and display a visual representation of the real-time depth and texture image data being acquired during the scan in real-time so that the operator can view and have feedback of the portion of the load end face of the log load that is currently in the field of view of the sensors 52, 56.

Figure 5A:
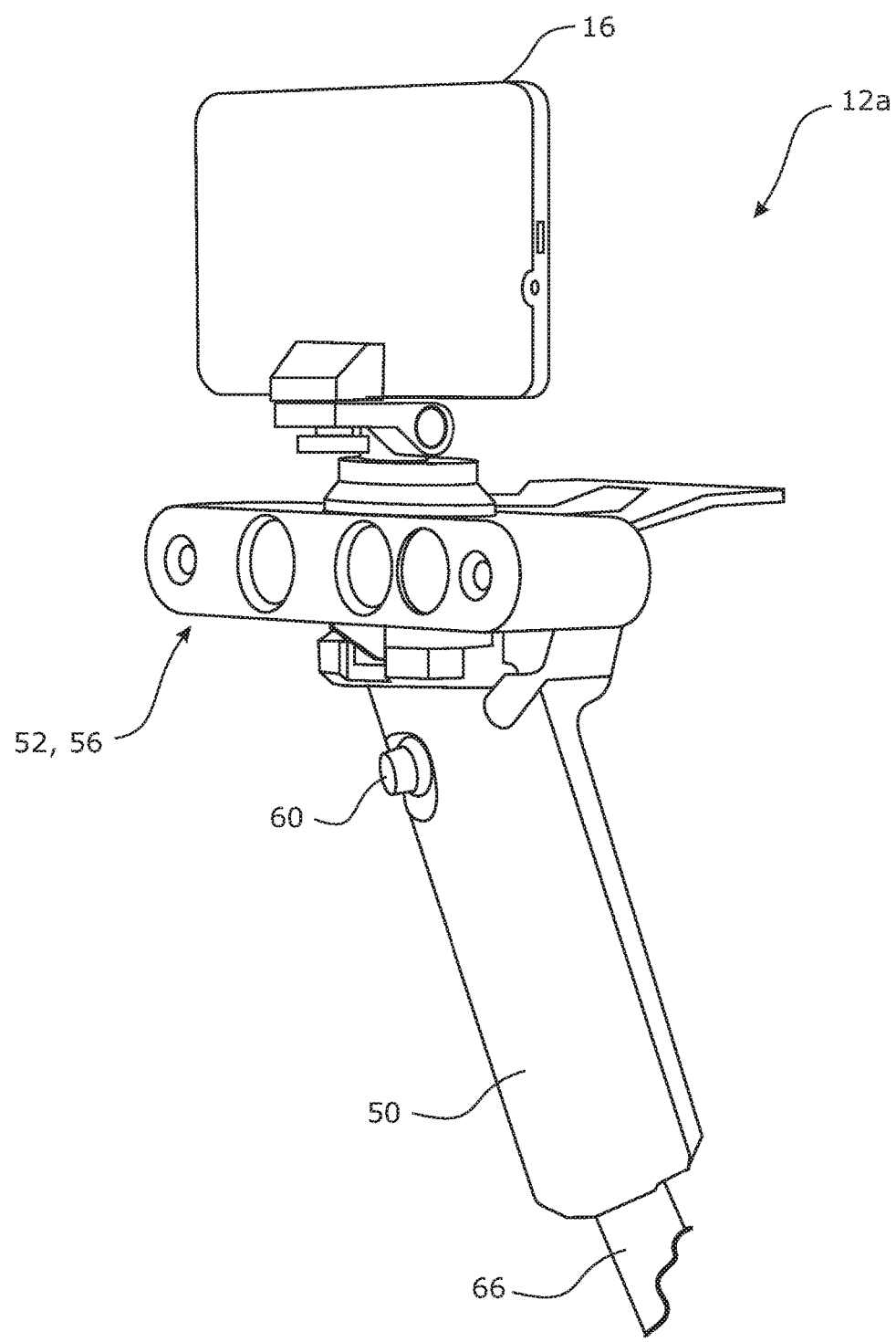
FIG. 5A shows a front perspective view of an alternative embodiment of the handheld scanner unit of FIG. 2.

In alternative embodiments, the operator interface device 16 may be integral to or mounted to the handheld scanner unit. For example, FIG. 5A shows an example of an alternative handheld scanner unit 12a similar to that shown in FIG. 2, but where the operator interface device 16 comprising a display is mounted to the handheld scanner unit rather than being a separate component. As shown, this alternative embodiment handheld scanner unit 12a also comprises the depth and texture sensors 52,56, handle 50, operable trigger button 60, and data cable 66 as before.

Figure 6:
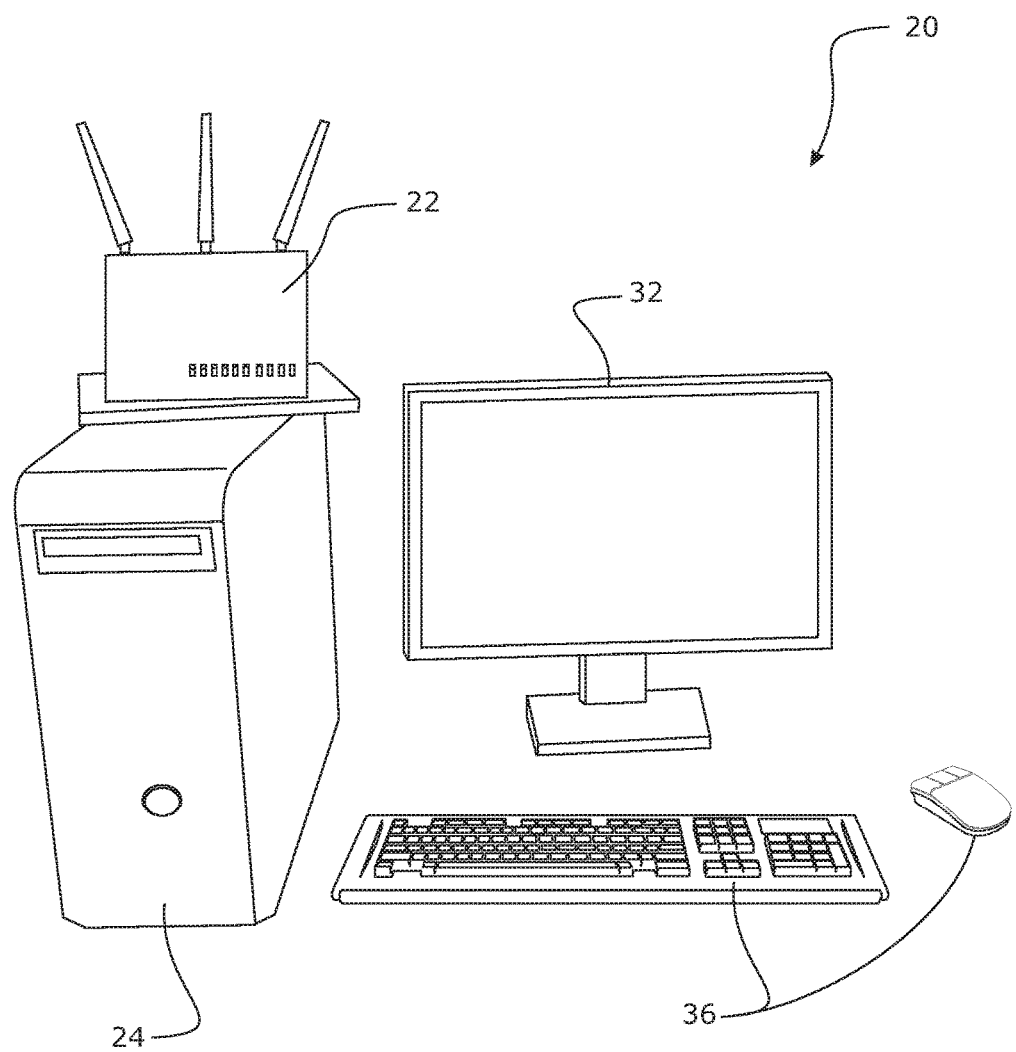
FIG. 6 shows a main data processing unit of the system in accordance with an embodiment of the invention.

Referring to FIG. 6, the data processing system 20 in this embodiment is shown. A wireless access point 22 is shown for establishing a wireless data communication link with the scanner controller 18 of the portable scanning system 11. The data processor 24 is in the form of a general purpose desktop computer 24 that is connected to the wireless access point and which has an associated display 32 and user interface components 36 such as keyboard and mouse for controlling the computer. As will be appreciated by a skilled person, the primary purpose of the data processor 24 is to carry out the heavy image processing of the depth and texture image data captured by the handheld scanner unit 12 that is wirelessly transmitted to the wireless access point 22 of the data processing system 20. In alternative embodiments the data processing system 20 need not necessarily have a display or user interface, and may simply be configured to carry out the data processing and output the log load report or data files for viewing on other computers or machines and/or storing in a database or other storage devices or in a cloud server for example.

3. Scanning Process and Data Capture

Figure 7:
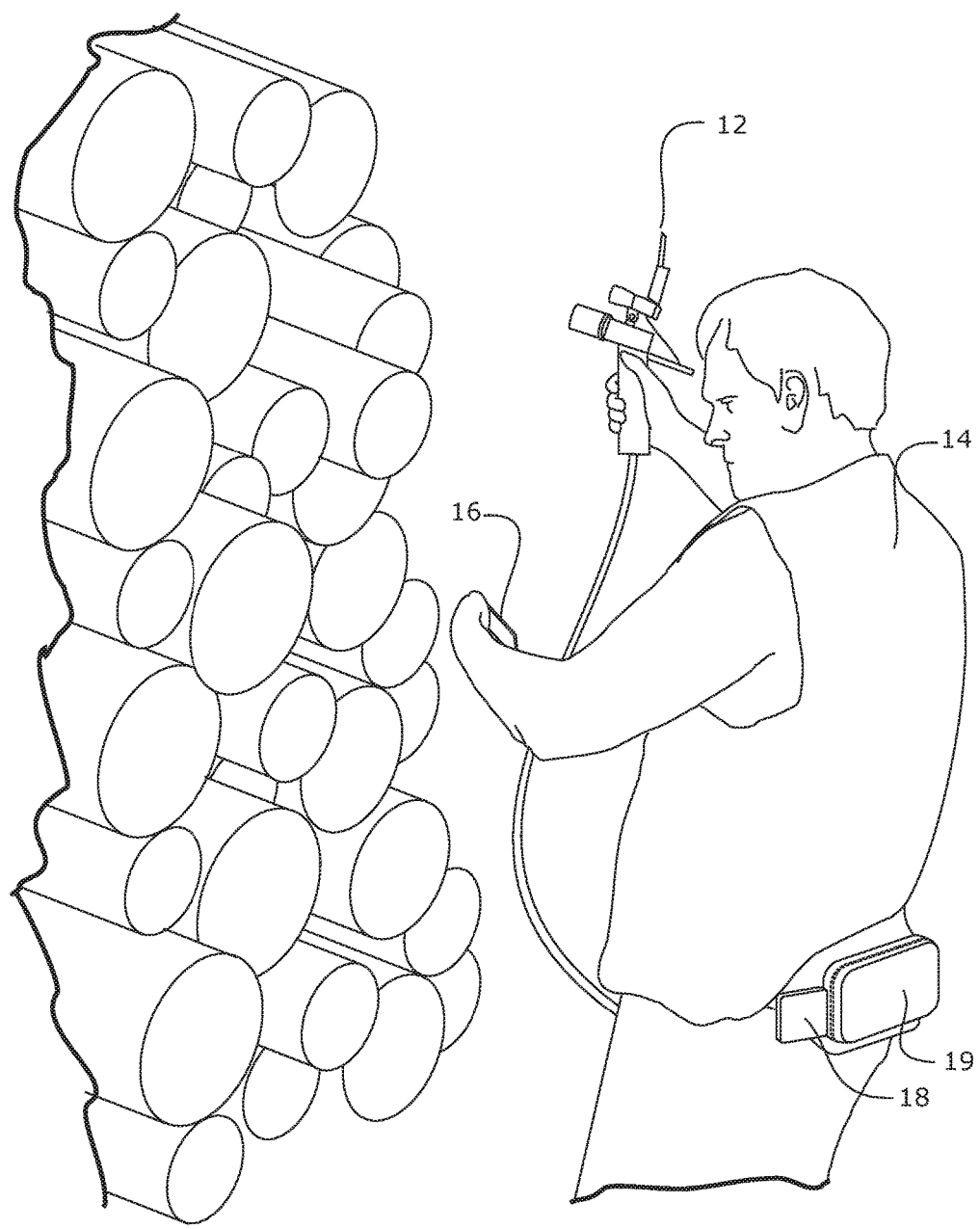
FIG. 7 shows an operator holding the handheld scanner unit and operator interface device while scanning the load end face of a log load on the back of a logging truck.

By way of example, a typical scanning process carried out by an operator using the system 10 will now be explained. The operator attaches the scanner controller 18 and power source 19 around their waist using a belt or belt bag or similar and holds the handheld scanner unit 12 in one hand and the operator interface device 16 in the other hand. The operator scans the load end face of a log load in an action similar to spray painting as shown in FIG. 7. As the handheld scanner unit is scanned over the load end face, it acquires synchronised and calibrated raw depth images and texture images from the depth camera 52 and texture camera 56 of the handheld scanner unit 12. In this context, 'synchronised' means that pairs of depth and texture images are acquired at the same instant in time and 'calibrated' means that the intrinsic parameters of the sensors 52, 56 (for example focal length, scale factors, distortion) and the rigid body transformation between the sensors is known based on their mounting position relative to each other on the handheld scanner unit 12.

In this embodiment, the operator 14 typically is located at a stand-off distance from the load end face in the range of approximately 1.5 to approximately 2 meters, but this may be varied or altered depending on the sensors used. In particular, the stand-off distance will be dependent at least partly on the range of capture and field of view of the depth and/or texture cameras. The operator typically walks along relative to the load end face of the logs on the logging truck to acquire image data of the entire load face progressively. The typical time to acquire the texture and depth image data of the entire load end face is generally around 20-30 seconds for a typical log load on a logging truck. The field of view of the depth camera 52 and texture camera 56 is typically smaller than the surface area of the entire load end face of the log load and therefore the scanner is moved and manipulated relative to the load end face to capture a series of partially overlapping pairs of depth and texture images to capture the entire load end face. The frame rate of the cameras may be varied depending on the requirements. In this embodiment, the frame rate is approximately 30 frames per second (FPS), and both cameras are triggered at this frame rate. At such frame rates, typically a collection of approximately 600-900 pairs of depth and texture images is acquired during the scan, although it will be appreciated that the number of digital depth and texture image pairs captured may vary depending on time taken to scan the entire load end face and the configured frame rate of the depth and texture cameras 52, 56 of the handheld scanner unit 12.

Figure 7A:
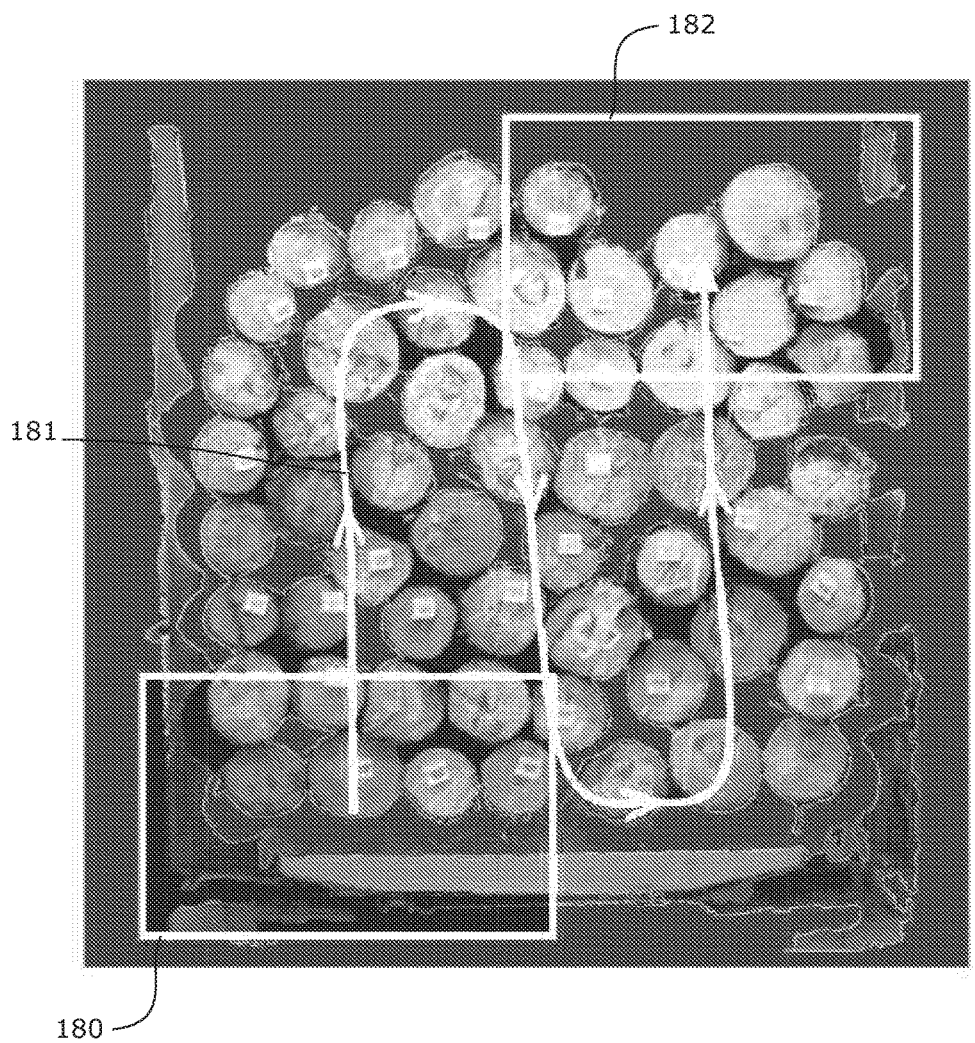
FIG. 7A shows an example of a possible scan path for the handheld scanner unit when an operator scans a log load in accordance with an embodiment of the invention.

Referring to FIG. 7A, an example of the scanning of the log load will be explained further. The field of view of the depth and texture sensors 52,56 is shown at the start of the scan at the lower left corner of the load end face at 180, and the operator moves the scanner to follow the general N-shaped scanning path identified at 181 until completing the scan at the top right corner of the load end face shown at 182. It will be appreciated that this scan path is not restricted to that shown in FIG. 7A, and many other possible scan paths may be used to capture the required scan data from the load end face for processing. In some configurations, preferred scan paths may be suggested or required, but in other configurations the scan paths may be arbitrary or randomly selected by the operator.

In this embodiment, the log scanning system is configured for free-form scanning of the handheld scanner unit over the load end face of the log load by an operator. It will be appreciated that in alternative embodiments, the system may further comprise an operable powered carrier system, such as a robotic arm or similar, that that handheld scanner unit can be mounted or coupled to, and where the carrier system can be automated or controlled by an operator to scan the load end face of the log load by moving the scanner unit through a scan path relative to the load end face. If automated, the scan path may be predetermined or pre-configured, or if the robotic arm or carrier system is manually controlled via a remote device or system, the operator may control the scan path, which could be in accordance with recommended scan paths or arbitrarily selected scan paths.

In this embodiment, the depth camera and texture camera are simultaneously triggered with the same pulse trigger signal to capture images at a frame rate of 30 FPS or any other suitable frame rate. In one configuration, the streams of depth and texture image pairs are all sent for data processing to extract the required information being scanned measured from the load end face. In another configuration, the handheld scanner may be configured to send all the depth images, but only a sub-sample of the texture images such as every $3^{rd}$ texture image, for data processing, with the not selected captured texture images being discarded. In this configuration, the data processing is performed on a series of depth images and a series of texture images, in which each texture image has a corresponding depth image, but not every depth image has a corresponding texture image. In another configuration, the texture camera is triggered with a filtered or modified trigger signal at a lower frequency, such as 10 FPS, i.e. by using circuitry or software to suppress or remove two out of every three of the pulses of the main trigger signal. In this configuration, the need to capture and then discard two out of every three texture images is avoided. In another configuration, the texture camera may be triggered at a lower frequency or frame rate based on the main trigger signal, but dynamically sub-sample based on the movement of the handheld scanner. For example, if the handheld-scanner was relatively still or below a predetermined movement threshold, the number of texture images sent for processing would be reduced to reduce processing of redundant image data.

As will be described in further detail later, the small end of each log in the log load is provided with an ID element comprising a unique log ID data or code associated with the individual log. In this embodiment, the ID element is typically in the form of a machine-readable code such as, but not limited to, a barcode or Quick Response (QR) code that is printed on a label or sheet and applied as an ID tag at approximately the centre of the small end face of each individual log via a staple, adhesive or the like (see FIG. 10 for example). In this embodiment, each individual log is provided with a single ID tag on its small end only. In some log loads, all small ends of the logs are at the same end of the log load. In such situations, the operator need only scan the load end face comprising the ID tags. However, in other situations the logging trucks can be loaded with the small ends of individual logs being mixed between both ends of the log load. In these situations, the operator must undertake two separate scans, one scan at each load end face of the log load. The data from each of the two scans is then combined to generate the output data related to the log load, as will be explained in further detail later.

Figure 8A:
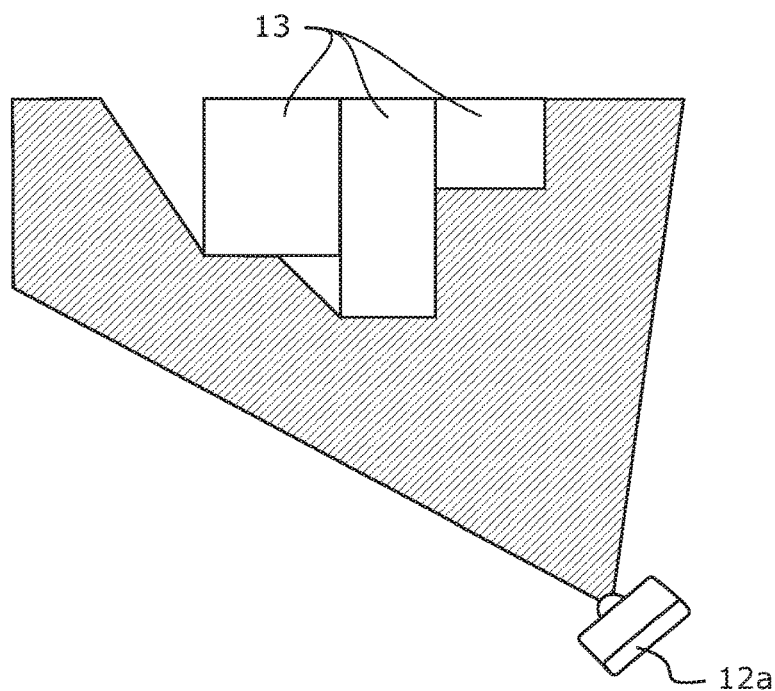
FIGS. 8A and 8B show schematically how occlusion in the imaging of a load end face of a log load can be minimized by scanning the load end face from multiple viewpoints and/or positions.
Figure 8B:
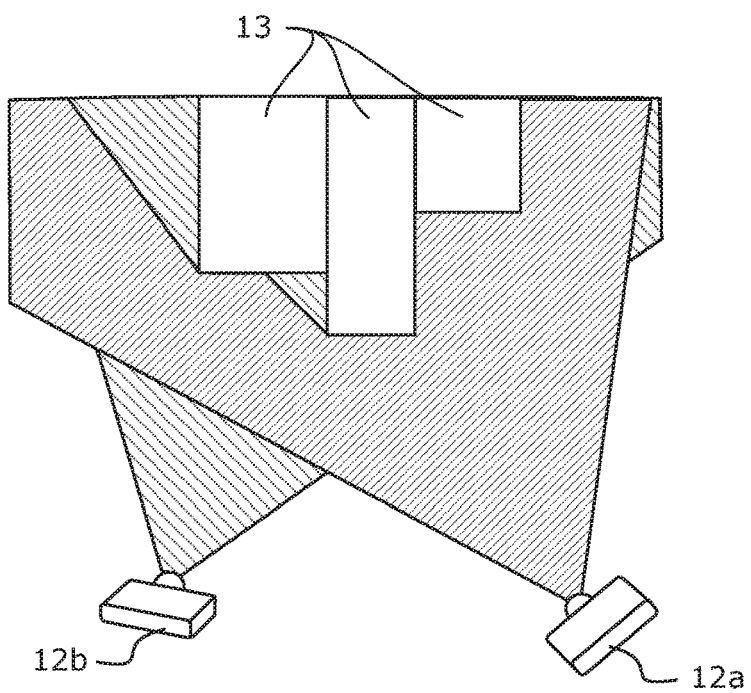

During the scanning of the load end face, it is important that the depth and texture data is acquired for all logs in the log load. To enable this, the operator needs to be provided with reasonable uninhibited movement along the log load end and be able to capture the images at the top and bottom of the load end face and along the entire width of the log load. Referring to FIG. 8A, a schematic illustration is shown of how restricted movement can lead to occlusion because some logs may protrude out further than others in the log load. FIG. 8A shows what the depth and texture cameras view from a single position 12a. From this position, depth and texture data for part of the large log on the left cannot be obtained because the log next to it protrudes out further. Referring to FIG. 8B, the view of the depth and texture cameras of the handheld scanner unit are shown from a new position 12b with the previous view 12a superimposed. This schematic illustrates how complete coverage can be achieved by scanning the load end face from multiple positions and viewpoints. The ramps provided at logging checkpoints at ports provide an ideal platform for an operator to move along to scan the load end face, for example.

Figure 9:
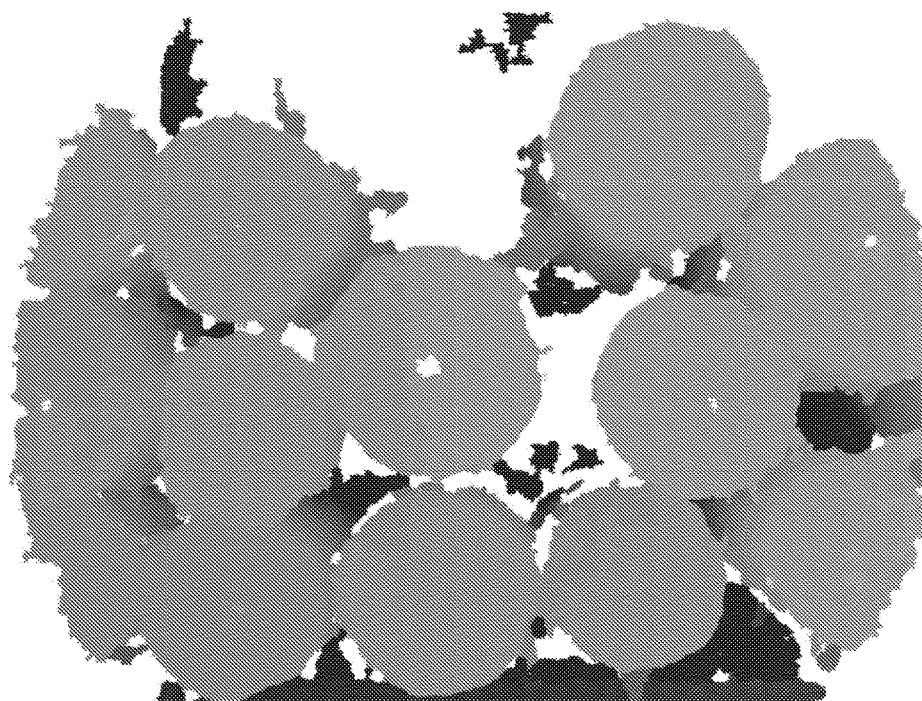
FIG. 9 shows an example of raw depth image of a load end face of a log load captured by a depth sensor of the handheld scanner unit of the system.
Figure 10:
FIG. 10 shows an example of raw texture image of the load end face of a log load captured by the texture sensor of the handheld scanner unit of the system.
Figure 11:
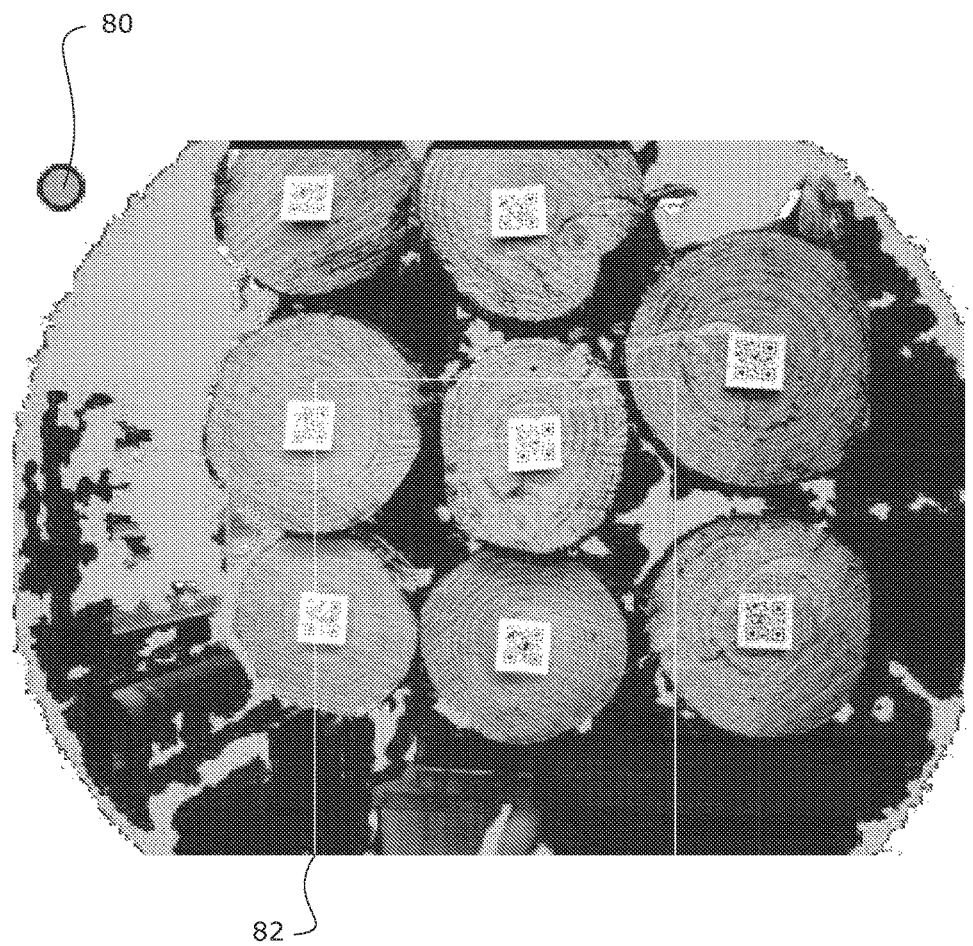
FIG. 11 shows an example of the display image seen on the operator interface device of the system during a scan of a load end face of a log load.

By way of example with reference to FIGS. 9-12, some of the raw depth and texture images captured during a scan of a load end face will be shown. FIG. 9 shows a typical raw depth image captured by the depth camera 52 of the handheld scanner unit 12. As shown, the field of view of the depth camera captures only a portion of the load end face in this raw depth image. The data appears in a circular region in the raw depth image because the IR interference filter on the lens has an attenuation that is angle dependent. FIG. 10 shows the synchronised raw texture image captured at the same time as the depth image of FIG. 9. The raw texture image of FIG. 10 is captured by the texture camera 56 as previously explained. In FIG. 10, the machine readable ID tags, in this example QR codes, of the individual logs are shown at their substantially central location on the log ends. FIG. 11 provides an example of scan image presented or displayed to the operator on the operator interface device 16. The displayed image represents the real time depth and texture image data being captured by the depth and texture cameras 52 and 56. The grey area shows values not seen by the current depth image (e.g. where the features are too far away or there is too much infrared interference for example). The indicator symbol 80 in the top left hand corner of the screen indicates the current status of the handheld scanner unit 12 in regard to the exposure setting. The indicator 80 may be colour coded for example. For example, the indicator 80 may be green which indicates that the exposure has been set and scanning can proceed. The indicator may then turn red while collecting images and may be yellow while the exposure is being set. In this example, the white rectangle indicated at 82 indicates the region of the image that is used to set the exposure. In this embodiment, it is preferable that at least one machine readable ID tag is present in the area while the exposure is being set so the computed exposure values ensure the tags are bright but still readable.

4. Data Flow and Processing

The data flow and data processing in the system will now be described with reference to an example embodiment.

Overview of Data Flow and Data Processing

Figure 12:
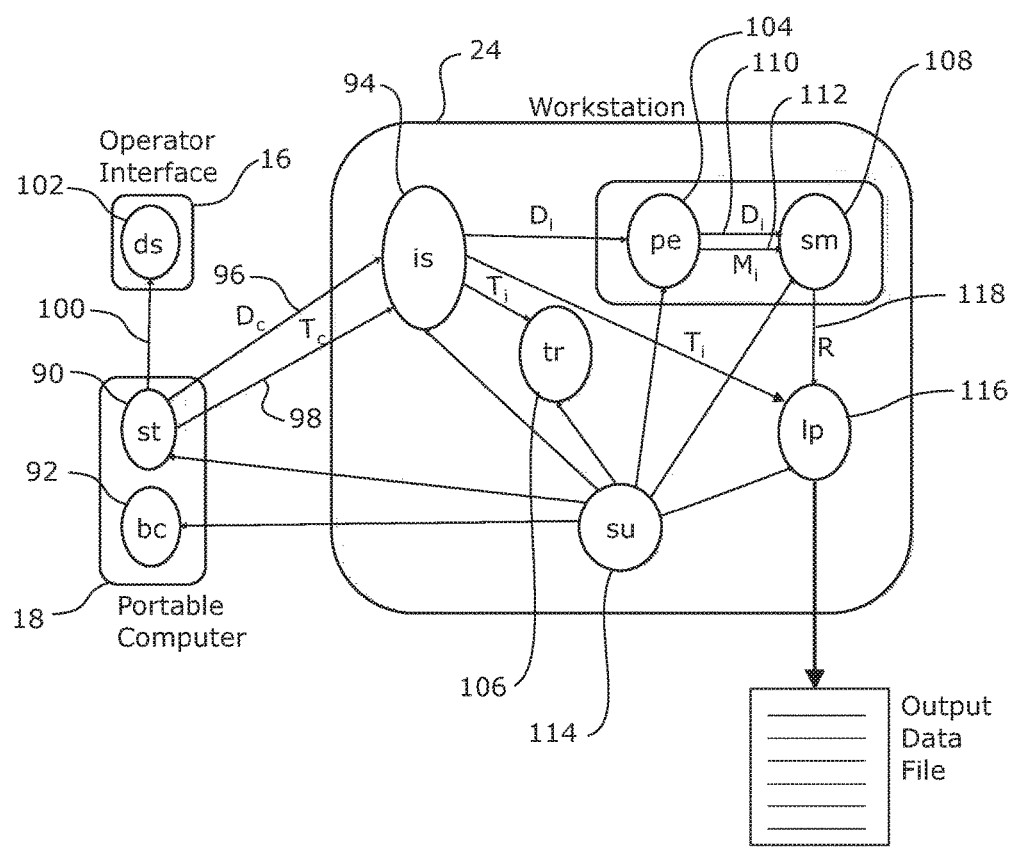
FIG. 12 shows a schematic diagram of the software architecture and data processing components of the system in accordance with an embodiment of the invention.

Referring to FIG. 12, the high level overview of the software architecture of the system is shown, in particular the various software components and/or functions and/or modules deployed or implemented on the various hardware components of the system will be described. A summary of the data processing component referred to in FIG. 12 is shown in Table 1 below.

TABLE 1

Summary of data processing components in FIG. 12

| | |
|---|---|
| st | scan_tool |
| bc | button_controller |
| ds | display |
| is | images_saver |
| tr | tag_reader |
| pe | pose_estimator |
| sm | surface_modeller |
| su | supervisor |
| lp | load_processor |
| $D_c$ | compressed depth image |
| $T_c$ | compressed texture image |
| $D_i$ | $i^{th}$ depth image |
| $T_i$ | $i^{th}$ texture image |
| $M_i$ | $i^{th}$ pose of sensor head |
| R | raycast depth image |

The scanner controller 18 comprises a scan tool component 90 and a button controller component 92. The scan tool component 90 executes on the scanner controller 18 and performs various functions that will now be described. The scan tool 90 provides an interface with the depth sensor 52 and texture sensor 56 hardware and acquires the depth and texture images from the sensors during a scan. The scan tool 90 also forms a compression function on the depth and texture images to compress the depth and texture image data for transmission over the wireless data link 26 to the data processing system 20. In this embodiment, the scanner tool 90 is also configured to sub-sample the series of texture images in time. By way of example, in this embodiment every third texture image is transmitted for data processing to reduce the volume of data for processing. The scan tool 90 is also configured to adjust the exposure of the texture sensor 56 so that the machine readable ID tags, such as QR codes, and the bark-wood boundary can be processed, as will be explained in further detail later. In this embodiment, the scan tool 90 is configured to control the transmission of the compressed depth images ($D_c$) and compressed texture images ($T_c$) to the images saver component 94 of the data processing system 20 over a wireless data link as shown at 96 and 98. The scan tool 90 is also configured to generate operator display images from the depth and/or texture images and transmits them as shown at 100 to the operator interface device for viewing on the display 102 of the operator interface device as previously described.

The display component 102 on the operator interface device 16, which is for example a smartphone or tablet or similar mobile computing device with a display screen, is configured to open a port for scan tool 90 to attach to and also displays the images received on the port from the scan tool 90 on the display screen of the operator interface device. The display component 102 may be an application running on the smartphone or tablet. As previously discussed, the operator interface device 16 may be connected to the scanner controller 18 with a USB cable. In this embodiment, a TCP/IP connection is made over the USB data link. The application 102 on the operator interface device opens up a socket and waits for a client, such as the scan tool component 90, to connect.

The scanner controller 18 also comprises a button controller component 92. The button controller 92 performs various functions. One function in this embodiment is context dependent filtering of button actuations. If an operator presses or releases the trigger button 60, the action is ignored unless the system is in a state where trigger actuations are meaningful. The button controller also acts as an interface for receiving and processing the button actuation signals or messages from the sensor controller 62 of the handheld scanner unit 12.

The data processor 24 of the data processing system 20 comprises an images saver component 94 that receives the data streams 96, 98 of compressed depth and texture images ($D_c$, $T_c$) from the scan tool 90 of the scanner controller 18. In this embodiment, the data streams of depth and texture images are transmitted to the data processor 24 from the scanner controller 18 in real-time as they are captured to enable data processing to commence immediately. However, it will be appreciated that in alternative embodiments the image data may be sent in a series of batches during the scan or transmitted all at once at the end of the scan in alternative configurations. The images saver 94 is configured to decompress the compressed depth and texture images received and saves the decompressed images to data storage 34, such as a hard drive for example. The images saver 94 is also configured to send the uncompressed images ($D_i$, $T_i$) onto other components operating in the data processor 24, including for example the pose estimator component 104 and the tag reader component 106.

The tag reader component 106 is configured to receive the texture images ($T_i$) from the images saver 94. The tag reader 106 is then configured to image process the texture images to locate and read all QR codes in each image. In this embodiment, the tag reader 106 is configured to write a ID tag data file comprising the unique ID tag data for each tag located in each image, and a ID tag summary data file comprising data indicative of how many times each ID tag was seen in the series of texture images captured during the scan of the load end face of the log load.

Figure 14:
FIG. 14 shows a processed texture image of the load end face of a log load in which individual log ID tags have been located and decoded.

By way of example, FIG. 14 shows a texture image after being processed by the tag reader component 106. Each of the QR tags have been found and correctly decoded. By way of further example, a small section of an example ID tag data file generated is given below in Table 2 showing the contribution of the texture image of FIG. 14 and a small bit of the previous and following texture images.

TABLE 2

A portion of an example ID tag data file including ID tag data extracted from the texture image of FIG. 14

| 9194 | DK1170292 | 351.75 | 565 |
| 9194 | DK1170288 | 1581 | 340.75 |
| 9197 | DK1170139 | 357.5 | 1653.25 |
| 9197 | DK1170294 | 942.75 | 1609.25 |
| 9197 | DK1170295 | 1512 | 1589.25 |
| 9197 | DK1170127 | 380 | 1149 |
| 9197 | DK1170276 | 1704.25 | 1063.75 |
| 9197 | DK1170293 | 914.5 | 963.25 |
| 9197 | DK1170292 | 359.5 | 564 |
| 9197 | DK1170288 | 1588.5 | 342.25 |
| 9200 | DK1170139 | 365 | 1647.5 |
| 9200 | DK1170294 | 950 | 1607 |

In Table 2, the 1st column is the image id, the 2nd column is the tag id, and the 3rd and 4th columns are the X and Y coordinates of the tag center in the texture image. The corresponding ID tag summary data file is shown below in Table 3.

TABLE 3

An example ID tag summary data file

| | |
|---|---|
| DK1170103 | 50 |
| DK1170115 | 76 |
| DK1170127 | 72 |
| DK1170139 | 124 |
| DK1170151 | 81 |
| DK1170216 | 39 |
| DK1170228 | 35 |
| DK1170240 | 38 |
| DK1170252 | 45 |
| DK1170264 | 108 |
| DK1170276 | 197 |
| DK1170288 | 69 |
| DK1170292 | 115 |
| DK1170293 | 127 |
| DK1170294 | 128 |
| DK1170295 | 115 |

Figure 27:
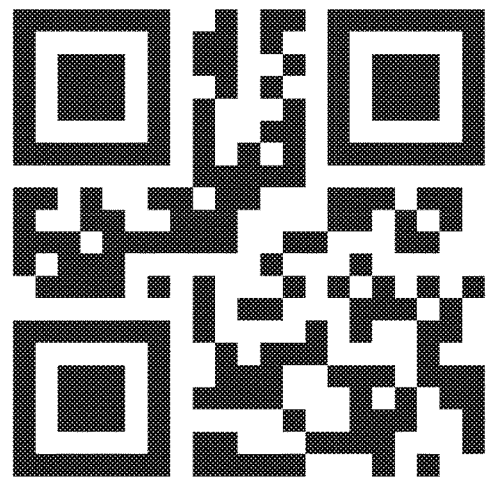
FIG. 27 shows an example of the type of log ID tag fixed to the small end of each log in the log load, which in this embodiment comprise a QR code.

In Table 3, it shows that 16 tags were found on the load and how many times each tag was seen over the complete set of texture images. The minimum number of times a QR code was seen is 35 for this load end. In this example, the smallest standard QR codes consisting of a 21 by 21 matrix were used. The codes were generated with the highest level of redundancy (most robust) allowing them to be decoded in some situations if partially covered. An example of the QR code of the ID tags used in this embodiment is shown in FIG. 27. As previously noted, it will be appreciated that the system may alternatively be used with other machine readable ID codes, such as barcodes, or any other visible ID elements and coded unique identification data.

Figure 13:
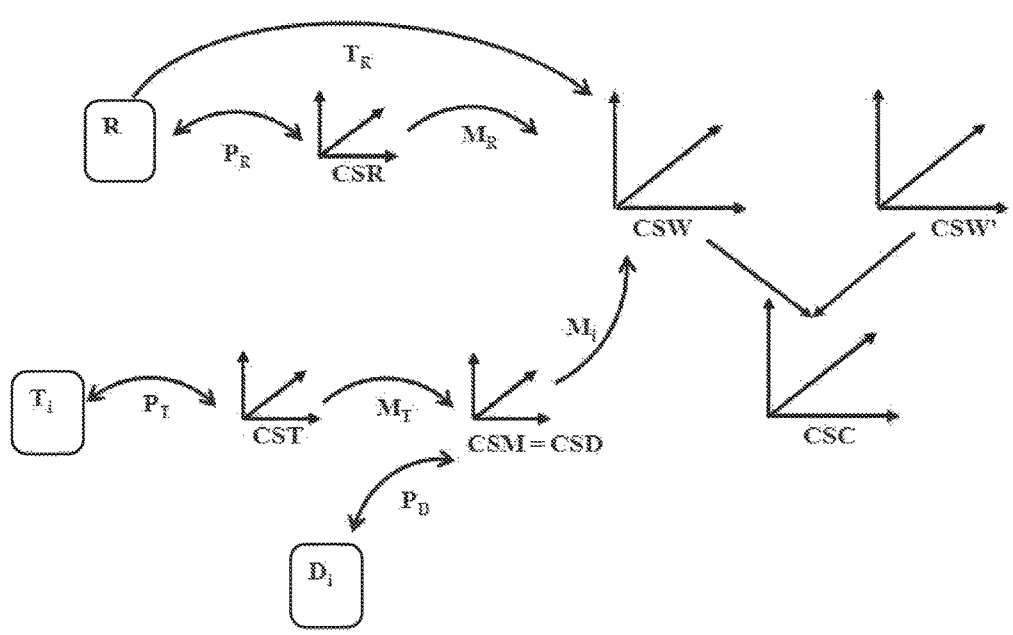
FIG. 13 shows a schematic example of various coordinate systems and transformations between the coordinate systems used in the data processing in accordance with an embodiment of the invention.

The pose estimator 104 and surface modeller 108 components for fusing the set of depth images captured during the scan to an implicit or 3D model, such as a spatial data structure, will now be described. The pose estimator 104 and surface modeller 108 will be described with reference to the associated coordinate systems used in the data processing shown in FIG. 13 and summarised in Table 4 below.

TABLE 4

Coordinate systems used in data processing flow

| | |
|---|---|
| CSR | raycast coordinate system |
| CST | texture camera coordinate system |
| CSM, CSD | moving coordinate system (aligned with depth camera) |
| CSW | world coordinate system |
| $P_R, P_T, P_D$ | projections between images and respective coordinate systems |
| $M_R, M_T$ | poses between coordinate systems |
| $T_R$ | transformation from R to CSW |

The pose estimator 104 is configured to receive the set of depth images ($D_i$) from the images saver 94. The pose estimator is configured to estimate the pose ($M_i$) of the handheld scanner unit 12 in the world coordinate system (CSW). In this embodiment, a data file is written comprising the image ID of each of the images and its associated pose ($M_i$). The pose estimator is then configured to send the depth images ($D_i$) and associated poses ($M_i$) to the surface modeller component 108.

A coordinate system is associated with the handheld scanner unit 12 which is called a moving coordinate system (CSM). The pose $M_i$ is the rigid body transformation which maps measurements from the CSM when $D_i$ was acquired to the CSW. In this embodiment, the pose estimation algorithm performs 3D self-registration to estimate the pose using a point-plane error function, as will be appreciated by a skilled person in 3D simultaneous localisation and mapping (SLAM) techniques. It will be appreciated that other pose estimation algorithms can alternatively be used if desired. In one such alternative example, the texture image data may be used to combine photo-consistency error with point-plane error to increase pose estimation accuracy.

The surface modeller component 108 is configured to receive the depth images ($D_i$) and poses ($M_i$) from the pose estimator 104 as shown at 110 and 112 respectively. The surface modeller 108 is configured to fuse all the depth images together into an implicit model, 3D model or spatial data structure. The surface modeller 108 is then configured to estimate the pose ($M_R$) that is parallel with the load face and level with the ground. The surface modeller 108 is then configured to use raycasting to generate an orthographic depth image (R) and orthographic normal image from the implicit model at pose $M_R$. One or more sets of raycast depth and raycast normal images may be generated. The normal images may be used to assist in determining how much to rotate the images to be parallel with the load end face for the final images. The final raycast depth image (R) and raycast normal image is then saved to the storage device 34, such as the hard drive of the data processor 24. The pose $M_R$ and the transformation ($T_R$) from the raycast depth image (R) to the world coordinate system CSW is also saved in a data file in storage 34 of the data processor 24. Optionally, the system may be configured to also raycast additional information from the implicit model, such as a vertex map and texture map, to assist in the data processing.

In this embodiment, the surface modeller 108 is configured to fuse the raw depth images ($D_i$) into a spatial data structure, such as a truncated signed distance function (TSDF). The TSDF is a discrete representation of an implicit function which models the logs. The data is fused together by finding the rigid body transformation between the current depth image and the TSDF and then accumulating the contribution from the current depth image frame into the TSDF. This is then repeated for the next depth image frame, and so forth for all subsequent captured depth images in the series or set acquired during the scan. The generated fused model is bigger than each raw depth image frame and covers the entire load end once all depth images are processed. The fusion also significantly reduces imperfections (noise) in the raw depth data.

Figure 15:
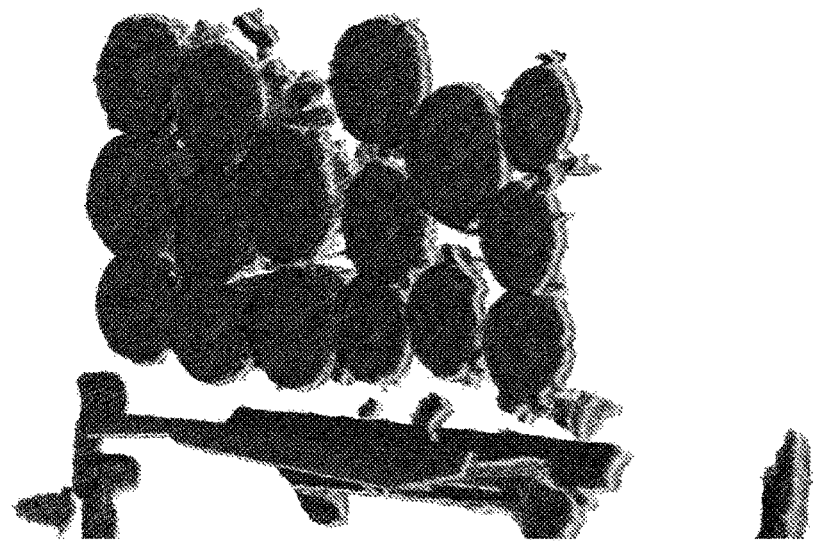
FIG. 15 shows a visual representation of a truncated signed distance function (TSDF) model of the fused raw depth images captured by the depth sensor of the handheld scanner unit during a scan of the load end face of a log load.
Figure 16:
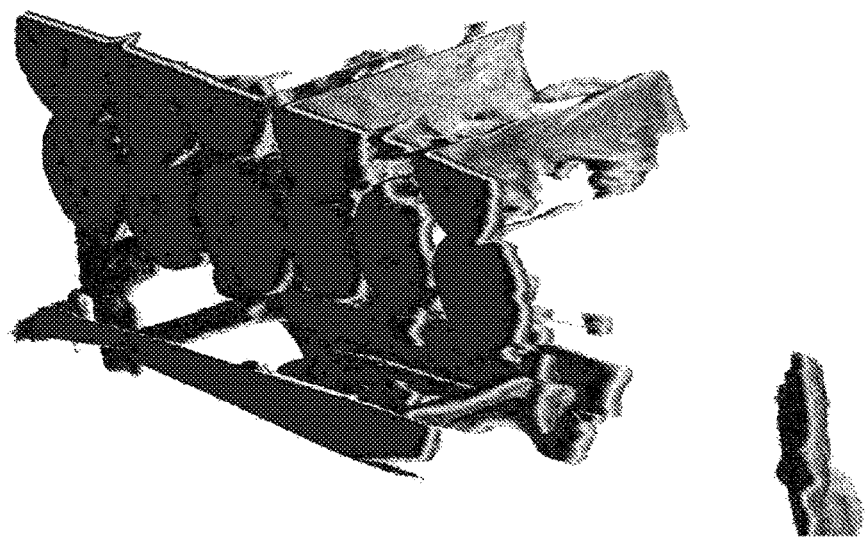
FIG. 16 shows a cross-section through the TSDF of the load end face of FIG. 15.
Figure 17:
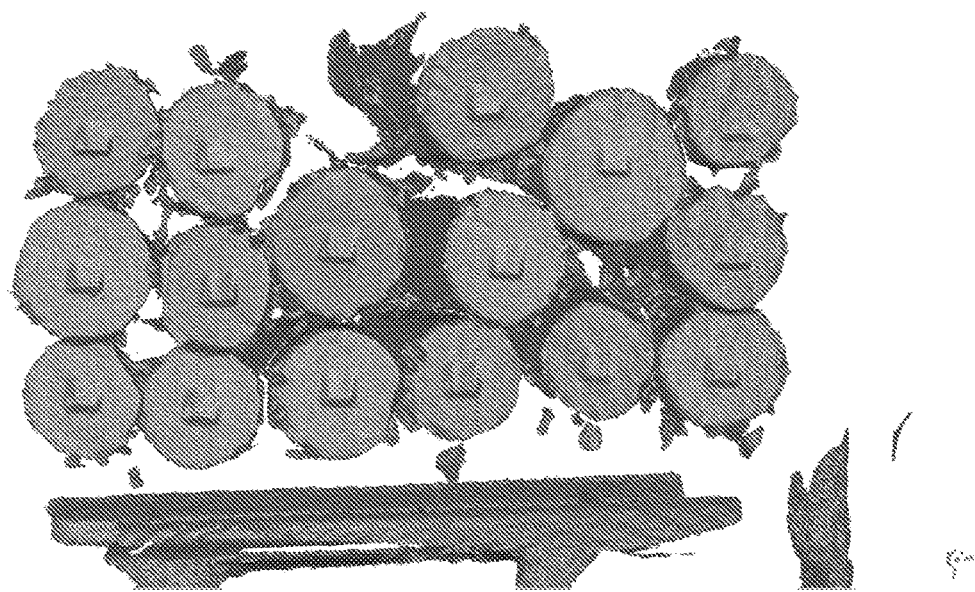
FIG. 17 shows visual representation of the mesh surface model generated from the TSDF of the load end face of FIG. 15.

By way of example, a rendered visualisation of a TSDF of a scanned load end face is shown in FIG. 15 and a cross section through the TSDF is shown in FIG. 16. The surface is depicted by the white region between the black regions representing the zero crossing of the function F (x, y, z). The TSDF is a discreet representation of a surface side distance function F (x, y, z). This function gives the distance away from the surface and the 3D surface is represented by the homogenous equation F (x, y, z)=0. The depth data comprised in the set of depth images ($D_i$) can be fused together as the pose ($M_i$) of each depth image ($D_i$) is known as calculated by the pose estimator 104 as described previously. This process of fusing the depth image data allows a model of the entire load end face of the log load to be formed and significantly reduces the effects of imperfections (noise) in the raw depth images, as noted above. By way of example, an algorithm such as 'marching cubes' can be executed to locate the zero crossings which results in a mesh surface model from the TSDF as shown in FIG. 17.

In this embodiment, the surface modeller 108 is configured to receive the accelerometer signals or data values sensed by the accelerometer in the handheld scanner unit 12 and uses an examination of the TSDF to calculate the load end face downward and normal directions. Using the calculated downward and normal direction, the surface modeller renders the orthographic images of the TSDF that are level and normal to load end face, using raycasting, as previously noted. Raycasting is a technique that will be understood by a skilled person in SLAM techniques.

In this embodiment, a single accelerometer reading or signal or value is sensed at the beginning of a scan, i.e. one accelerometer value per scan. In this configuration, the accelerometer value or data is in the form of an accelerometer data vector (vx, vy, vz). In alternative embodiments, an accelerometer need not be provided in the handheld scanner and the level may be obtained by processing the image data, such as based on the truck parts. In other alternative embodiments, the handheld scanner may be provided with alternative or additional inertial sensors. In one example, a gyroscope sensor may be provided in the handheld scanner unit and the sensed gyro signals may be used to supplement the pose estimation.

Figure 18:
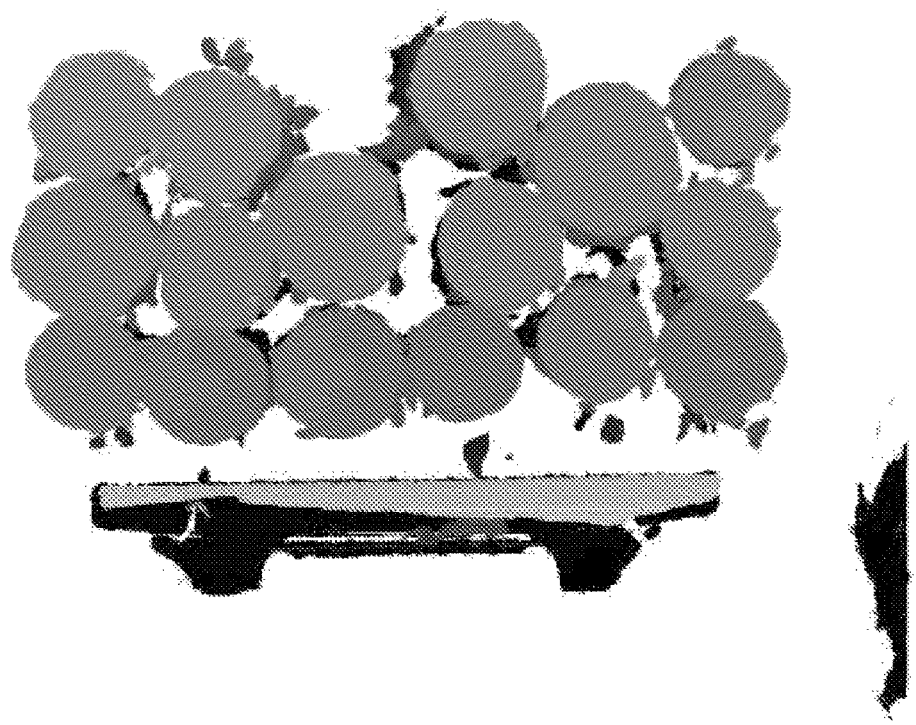
FIG. 18 shows a raycast orthographic depth image generated from the TSDF of the load end face of FIG. 15.
Figure 19:
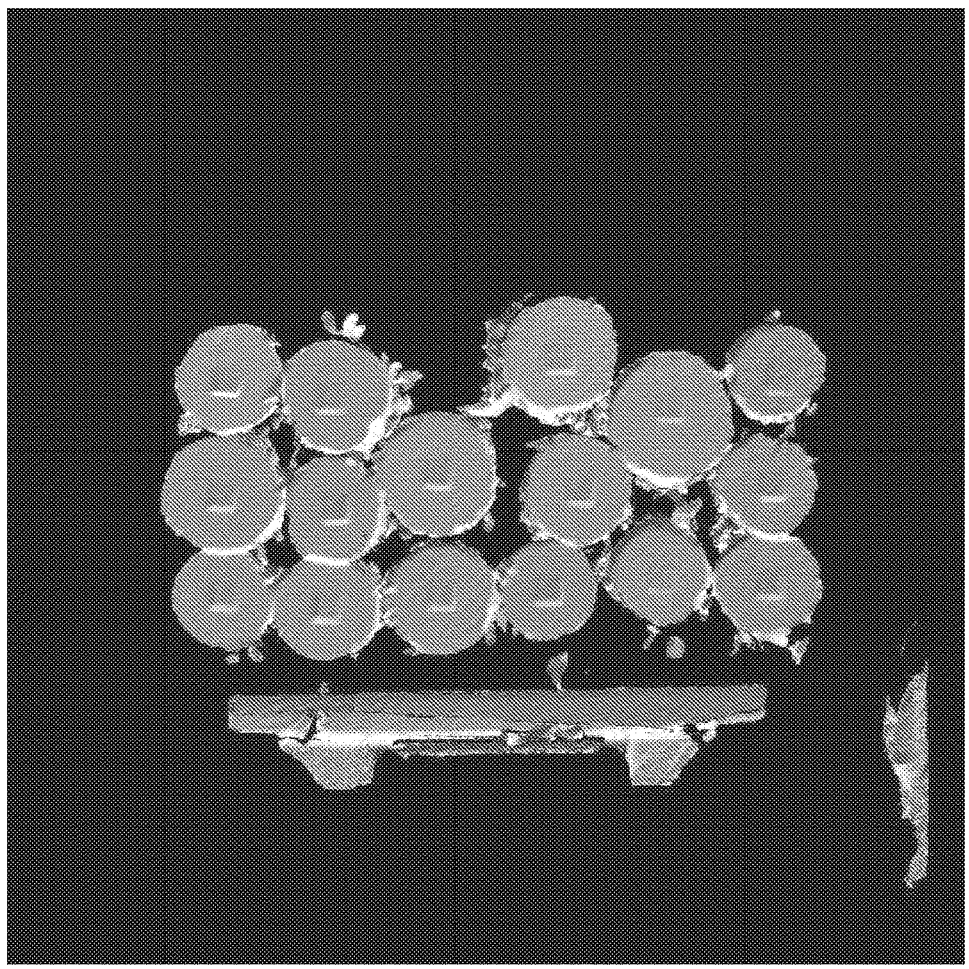
FIG. 19 shows a raycast orthographic normal image generated from the TSDF of the load end face of FIG. 15.

By way of example, FIG. 18 shows an orthographic raycast depth image of a load end face. Regions with no depth are shown in white in this embodiment. FIG. 19 shows an orthographic raycast normal image of the load end face. Regions with no normal are shown in black. The colours (not shown) in the orthographic raycast normal image represent the direction of the surface normal. For example, the colour 'gold' may be assigned to surfaces that are normal. The values in the orthographic raycast normal image that are not gold can then be filtered out to remove the sides of the logs for example. The raycast orthographic normal image is perfectly registered to the raycast orthographic depth image and this allows both images to be used together to clean the raycast depth image and remove unnecessary features such as truck or trailer parts or people or other non-log components or features captured in the scanning process.

In this embodiment, the data processor 24 comprises a supervisor 114 that is configured to receive and coordinate the various other components in the data processor 24 and portable scanning system 11. For example, the supervisor component 114 is configured to inform the various other components that a scan has commenced and to synchronise the components. Further, the supervisor component 114 is configured to start or initiate the various components after a dependent component has completed their processing or tasks. The supervisor component is also configured to receive input or control signals from the user interface, such as comprising the button controller 92 of the handheld scanner unit 12 and the user interface 36 of the data processor 24. For example, the supervisor is configured to receive button control signals from the trigger 60 of the handheld scanner unit 12 to initiate and cease a scan and coordinate the various other components and functions in the system to process the data acquired during a scan.

The data processor 24 also comprises in this embodiment a load processor component 116. In this embodiment, the load processor 116 is configured to carry out two primary functions. Firstly, the load processor is configured to receive and process the raycast orthographic images from the TSDF of the load end face received from the surface modeller 108 as shown at 118. The purpose of the load end processing function is to extract the log end boundaries of the individual logs, and to determine log end diameters and associate the extracted unique ID data of the individual logs to the determined or measured log end diameter data. If a log load has logs with small ends at both ends of the log load on the truck or trailer, then the load end processing function will be run or executed twice, one for each set of load end face scan data. The second primary function of the load processor 116 is to generate output data generated from the scan, such as in the form of a report file comprising the log ID data, log count, and log diameter data and/or visual representations or graphical representations of the extracted data, as will be explained in further detail later.

Figure 20:
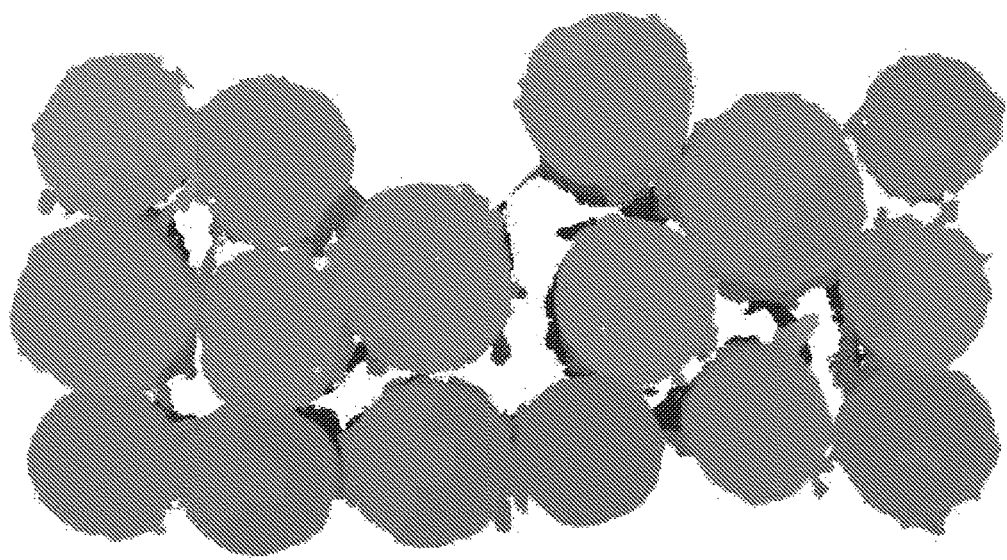
FIG. 20 shows the raycast depth image of FIG. 18 after removing non-log elements such as the person and truck parts from the image.
Figure 21:
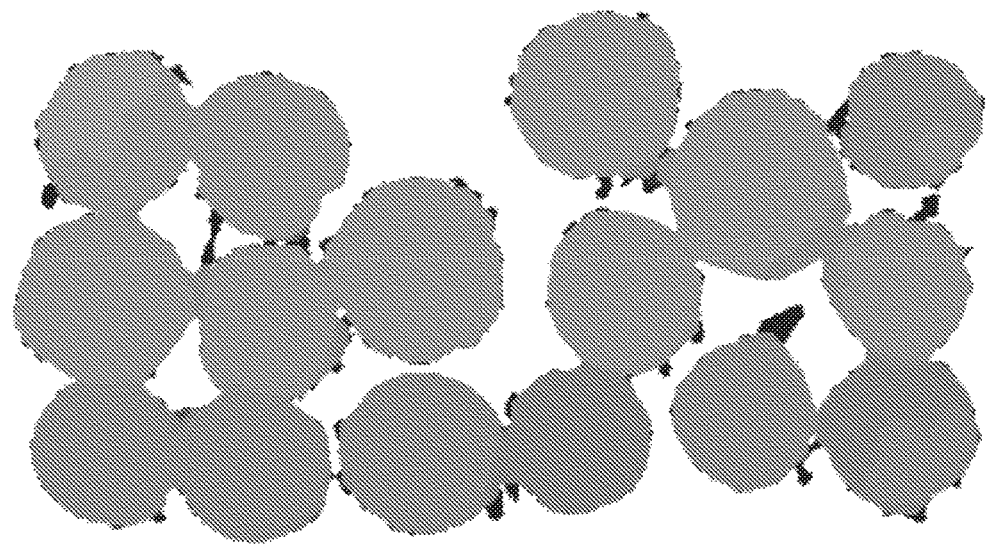
FIG. 21 represents the raycast depth image of FIG. 20 after further cleaning to remove loose bark from the log ends.

The load end processing function executed by the load processor 116 will now be described in further detail. In this embodiment, the load end processing function firstly cleans the orthographic raycast depth image (R) received from the surface modeller 108, in particular to remove truck or trailer or any other non-log features from the raycast depth image. FIG. 20 shows the raycast depth image of FIG. 18 after removing truck parts from the depth image. In this embodiment, the load end processing function is also configured to clean the raycast depth image to remove other features, such as loose bits of bark or the side portions of logs or similar. This further cleaning of the raycast depth image is carried out by image processing algorithms, and these may utilise the information provided in, for example, the raycast orthographic depth (FIG. 18) and normal (FIG. 19) image shown. FIG. 21 shows the raycast depth image of FIG. 20 after further cleaning processes have been executed.

The image processing algorithms for cleaning the images will now be described in further detail. In this embodiment, the cleaning algorithm is configured to remove non-log features, such as truck parts, from both the raycast orthographic depth and normal images using image processing. This image processing uses both the raycast depth and normal images as inputs because they contribute different information for cleaning. The depth images provide distances of features from the image plane, and the normal images provide orientations of feature surfaces. The depth and normal images are analysed to singulate connected components (continuous areas or regions) approximately corresponding to discrete objects. The cleaning algorithm then classifies these objects as either log or non-log, in the following steps:

1. The connected components are trimmed to retain only those that are approximately flat and aligned with the image plane (more likely to be log ends).
2. Components that are too small or too elongated are discarded.
3. Remaining components are used to find boundaries for the extent of the log face at the bottom, left and right sides. This is done by computing and accumulating several characteristic measures of the appearance of logs in the edges of the log end face, such as:
   vertical or horizontal alignment,
   log roundness,
   known width of truck and trailer cradles,
   agreement in depth with the rest of the face, and
   prevalent discontinuity between log and non-log features at the face edges.
4. The components that lie strictly within the log face boundaries are classified as logs.

In some embodiments, the image cleaning algorithms may further carry out the following steps or functions to clean the images of the load end face. The depth image of the face of the logs may be pre-processed by algorithms that focus on a few common problems that are evident in many loads. For example, it may detect narrow regions that are further forward than their surroundings as is typical of bark and other debris. Another example is that of small regions of missing data surrounded by valid data is typical of minor occlusions or other issues during scanning. The purpose of these is not to filter all of the data in the depth image, but rather to perform non-linear spatial filtering operations that target specific categories of unwanted artefact in the image.

Figure 22:
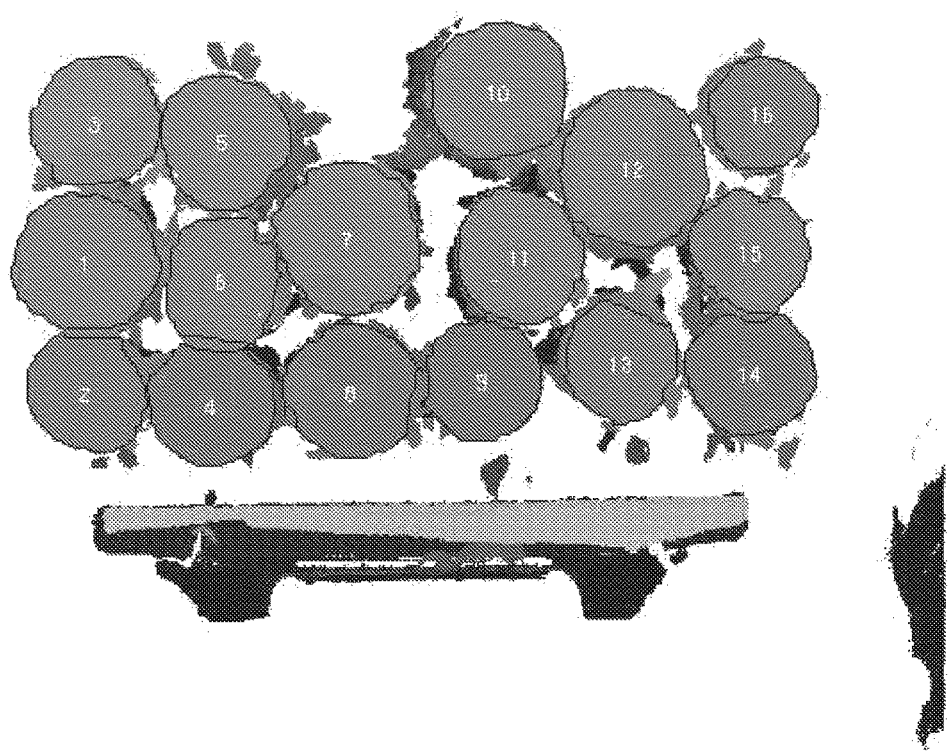
FIG. 22 shows a visual representation of detected individual over-bark log end boundaries superimposed onto the original raycast depth image of FIG. 18.

The cleaned raycast depth image is then processed to separate the individual logs using a log singulation algorithm and to determine the log end boundaries of each individual log. There is no standard or uniform log shape. Individual logs cannot be assumed to be even approximately circular. Large sections of log perimeter can be convex, concave or straight. Adjacent logs routinely fit closely together, with little or no gap between large sections of perimeter. There is a wide range of log sizes. Logs can be split, where each section is itself the size of a log. Logs can have voids within the core of a single log, which together with irregularly shaped perimeters or splits in the log, may confuse an algorithm. Loose bark is a major complication, and a complex phenomenon. Examples include bark that is semi-detached from a log, separating from the wood at a range of attitudes, bark hanging over the face of logs, and bark that is jammed between logs filling the expected void between logs. Some logs have sections missing from the end of the log. The fundamental properties utilised in separating the logs are the characteristics of the gaps and voids between individual logs, rather than an analysis of the extremely varied shapes and sizes of the logs themselves. Where log ends are sufficiently separated longitudinally (i.e. recessed or protruding), log interface boundaries can generally be readily determined. However in some cases, adjacent log ends are aligned longitudinally, and also lie tightly against each other for appreciable parts of their perimeter. These situations are analysed by looking for the characteristic V-shaped gaps between individual logs, voids between groups of logs, and applying logical rules to associate disjoint gaps to identify log end boundary lines. The output of this image processing step is a labelling of all the logs as shown in FIG. 22 and a log end boundary curve or line drawn around the end of each log. The log end boundaries generated from the cleaned raycast depth image represent an 'over-bark' log end boundary.

Figure 23:
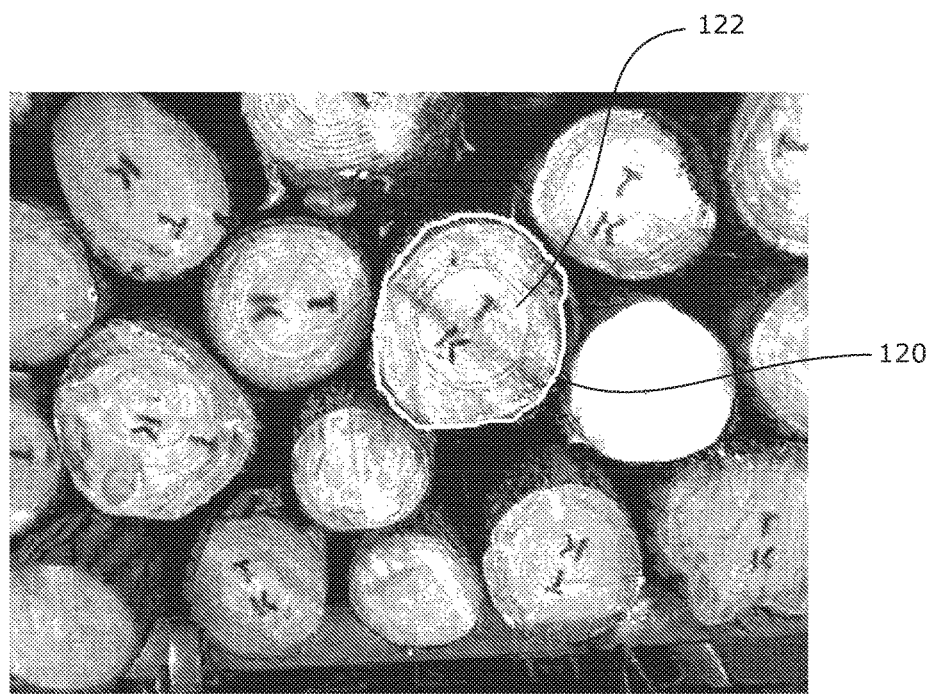
FIG. 23 shows a visual representation of the detected log end over-bark boundaries projected onto a raw texture image captured during the scan of the load end face of the log load.
Figure 24:
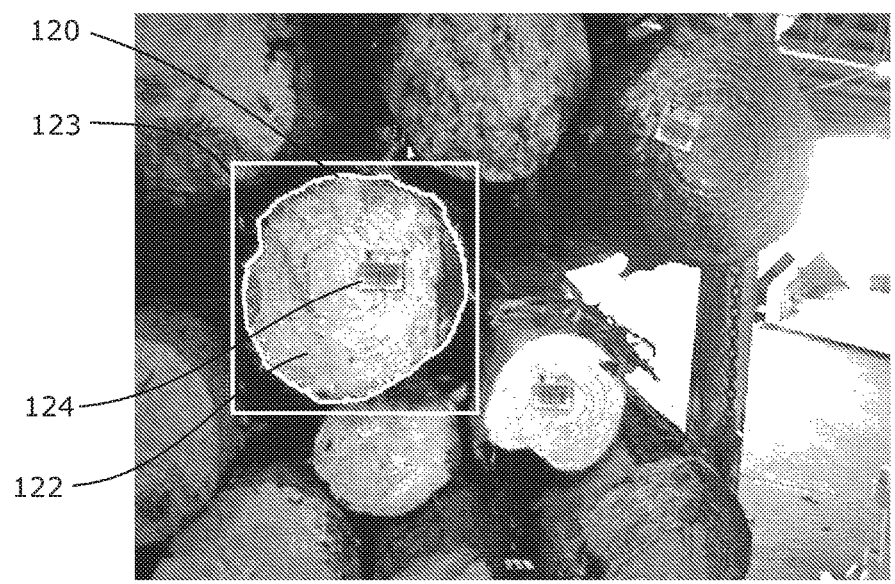
FIG. 24 shows detected log end over-bark boundaries projected onto a texture image captured during the scan of the load end face of the log load and in which the log ends include a log ID tag and a sub-image boundary associated with the log for subsequent image processing to locate and decode the ID tag.

In this embodiment, the load end processing function is also configured to refine the over-bark log end boundaries generated from the raycast depth image using the captured texture images ($T_i$). In particular, the texture images are utilised in a process of delineating or demarcating the wood-bark boundary of the log ends to improve the end result scaling accuracy from the log diameter measurements. In this embodiment, the over-bark log end boundaries determined from the raycast depth image are mapped and projected onto one or more of the 2D texture images ($T_i$). FIGS. 23 and 24 show examples of the log end boundary projected onto its associated log 122, with FIG. 24 also showing the boundary projected onto the texture image enclosing the associated ID tag 124 of the log 122. Referring to FIG. 24, in some embodiments, a bounding box or line 123 may be assigned to a log end and used to produce a small sub-image which is then image processed to decode the log ID from the ID tag. This approach can improve processing times as the entire texture image does not need to be processed. The sub-images are small and all the irrelevant regions are removed. Additionally, as the ID tags will generally appear in several texture images, the boundary can be projected onto all of the associated texture images and the code read from the multiple sub-images to increase reliability of the decoded ID associated with each individual log. In other embodiments, the system does not utilise bounding boxes and processes the entire texture image to identify and decode all visible ID tags.

The over-bark log end boundaries generated from the raycast depth image can be transformed and projected onto a texture image of the log as shown in FIGS. 23 and 24 because the pose of the handheld scanner unit 12 at each frame time of the pairs of captured depth and texture images is known from the pose estimator 104 and the depth and texture sensors 52, 56 are calibrated and synchronised.

Figure 25:
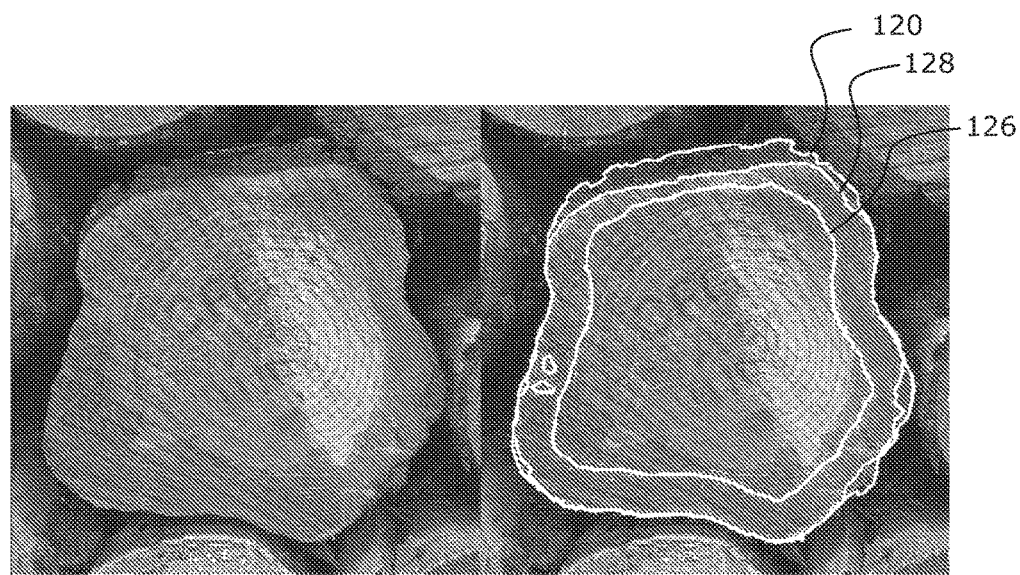
FIG. 25 shows a refined under-bark log end boundary determined by projecting the detected log end over-bark boundary onto a texture image and executing a wood-bark segmentation algorithm.

Referring to FIG. 25, the boundary refinement algorithm will now be described in further detail. FIG. 25 shows the projected outer (over bark) boundary curve or line generated from the raycast depth image at 120 on the log end in the texture image. The boundary refinement algorithm then generates an inner boundary curve within which there is expected to be no bark and this is indicated at 126. The two generated outer over-bark boundary 120 and inner boundary 126 lines or enclosing curves form an annular region between them. Within this annular region any bark, if present, should be locatable. The thickness of the annular region as defined by the distance of the inner boundary curve 126 relative to the outer over-bark boundary curve is determined based on the statistical stored data relating to the maximum thickness of bark expected for the particular tree species being processed. In this embodiment, this is expressed as a percentage of the log end diameter, together with the expected variance and the initial over-bark boundary generation curve 120. The inner boundary 126 represents a statistical curve for the individual log. With the annular region defined, the boundary refinement algorithm then image processes the texture region within the annular region to delineate between the wood-bark boundary without needing to process the entire texture image or texture image of the log end. The resulting refined boundary curve representing the under-bark log end boundary is shown at 128. As shown, a new refined boundary line 128 runs just below the bark, or along the outer boundary curve 120 where no bark is present or detected in that region of the log end.

The refined boundary line 128 is generated using a segmentation algorithm. In this embodiment, the segmentation algorithm is provided with the annular region of each individual log such that it knows where to look for the edge of the log end in the texture image for each individual log, and uses statistical information based on expected bark thickness for the species of log and is configured to make a decision to fall back to the initial boundary line generated from the raycast depth image if the log is covered in mud or otherwise fouled for example. The image processing segmentation algorithm detects the wood-bark boundary in the annular region to generate the refined log end boundary line 128 as discussed.

Figure 26:
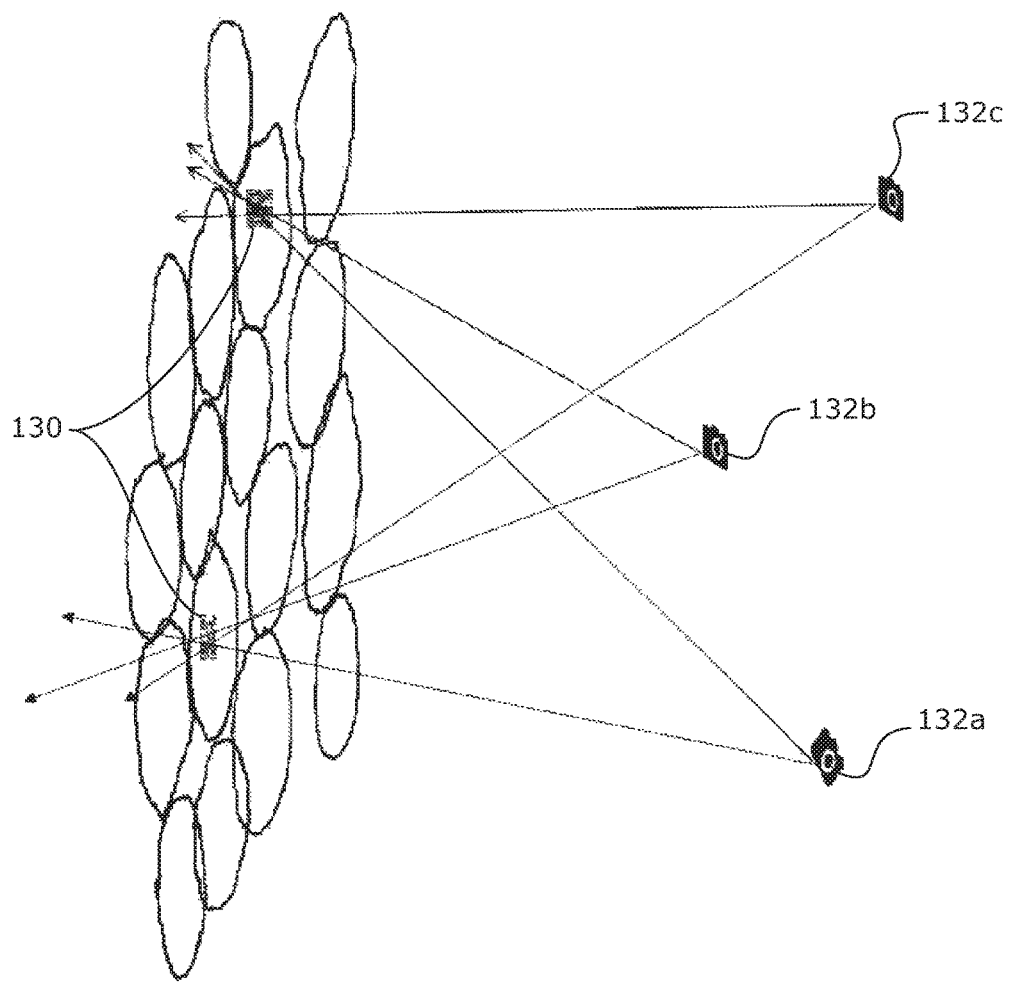
FIG. 26 shows a schematic diagram demonstrating the triangulation of the location of the log ID tags and associating or linking them with their respective log end boundary.

With the refined log end boundaries calculated, the load end processing function is then configured to calculate the planes associated with each log end face. In this embodiment, this is achieved by contracting the log end boundary by a predetermined amount, such as 10 mm, and a plane is fitted to the depth image data contained within the contracted boundary. The refined log end boundaries are then projected onto the calculated log end planes. This process removes noise on the log boundaries which is perpendicular to the log end faces. The log end boundaries and planes are then transformed into the metric world coordinate system (CSW). The load end processing function is then configured to calculate for each log the log boundary centroid, minor axes, orthogonal axis and log diameters. The ID codes extracted by the tag reader 106 are then associated or linked with their respective log boundaries. In this embodiment, the QR codes are linked or associated with the log boundaries by triangulating the QR code ID tag centre position (generated by the tag reader 106) in each texture image as shown in FIG. 26. In particular, by way of example, ID tags 130 are shown in FIG. 26 and the triangulating rays to each of these ID tags from the multiple pairs of captured depth and texture images from three sample positions 132a-132c in the scan data are shown schematically. While the triangulating rays of only three camera positions and associated texture images are now displayed, it will be appreciated that the triangulation for each ID tag can incorporate rays from as many texture images as the ID tag was captured in (refer to previous Tables 3 and 4 above for example).

Figure 28:
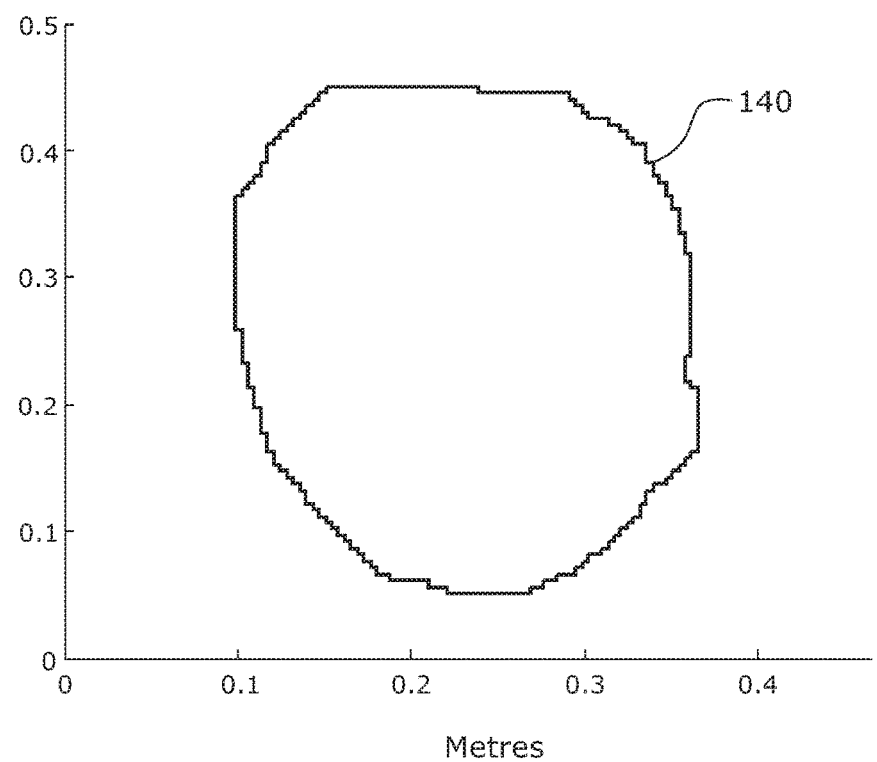
FIG. 28 shows a detected under-bark log end boundary graphically in metric units.
Figure 29:
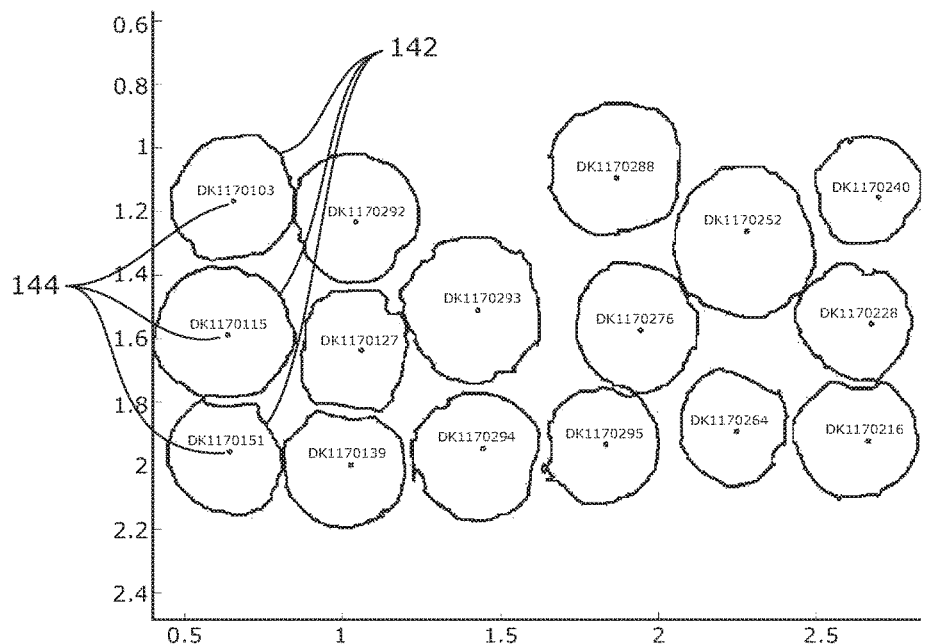
FIG. 29 shows the detected under-bark log end boundaries of a load end face of a scanned log load and their respective individual log ID codes.

By way of example, FIG. 28 depicts an example of a refined log end boundary 140 after it has been transformed into the metric world coordinate system CSW from which the log end diameter characteristics can be determined or calculated. FIG. 29 shows a graph of the projected refined log end boundaries 142 in the CSW looking straight onto the load end face. The centre markers 144 associated with each log end boundary represent the location of the triangulated ID tags (e.g. QR codes) and the associated decoded ID data is displayed. This process is robust because of the large number of rays being triangulated from the texture images. For example, the tag DK1170228 was seen in 35 texture images so would generate 35 rays converging on the tag location. Likewise, tag DK1170139 was seen in 124 texture images producing a system of 124 convergent rays.

The second primary function of the load processor 116 will now be explained. The second primary function is the report generating function executed by the load processor 116. The report generating function operates in one of two ways. If the log load has only one load end face scanned, i.e. all small ends and ID tags are at the same end of the log load, then it generates a load report comprising the identified ID codes associated with the individual logs of the load, a log count (determined from the number of individual log end boundaries detected), and their associated determined log end diameter measurements. On the other hand, if the log load has two load end faces scanned, i.e. for log loads in which the small ends and associated tag IDs are mixed between both ends of the log load, the previously described data processing is carried out on each load end face scanned and merged together to generate a final log load report.

Figure 30:
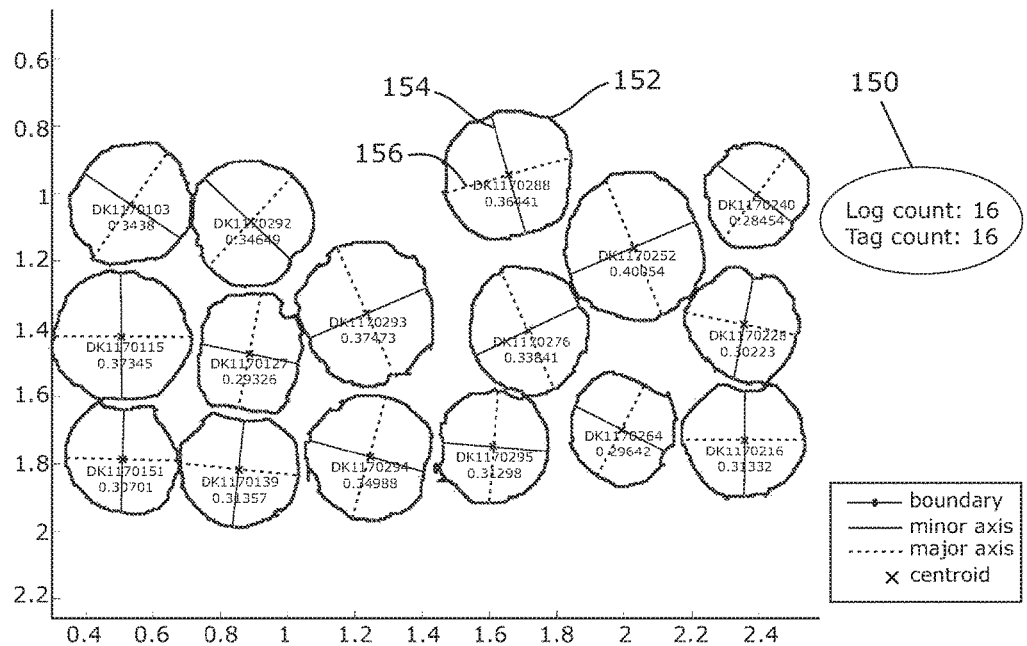
FIG. 30 shows a diagrammatic log load report generated from the system for a scan of one load end face of a log load in which all small ends of the logs with the ID tags are at that load end face.

Firstly, the case of a single load end face scan with all small ends at the same end of the log load will be discussed. FIG. 30 shows a diagrammatic form of the log load report generated. It can be noted that all log ends have tag ID information and the log count identified at 150 corresponds to the tag ID count. The minor axis and orthogonal axis for each small end are drawn and the length of the minor axis is displayed by way of an example. For example, for log end 152, the minor axis is shown at 154 with the orthogonal major axis at 156.

Figure 31:
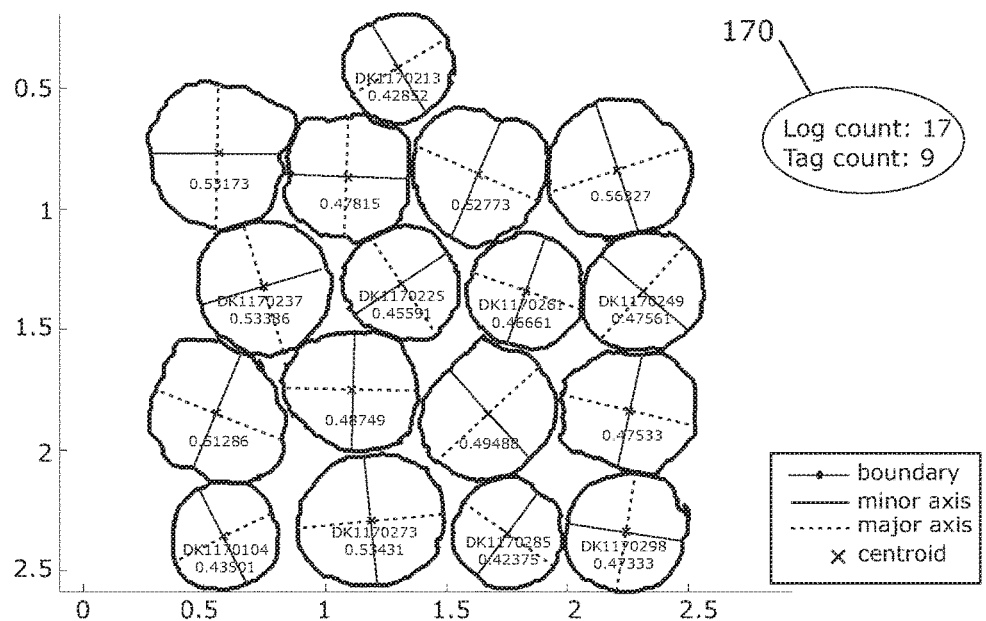
FIG. 31 shows a first diagrammatic log load report generated from a scan of a first load end face of a log load in which the small ends of the logs with ID tags are provided mixed between both ends of the log load.
Figure 32:
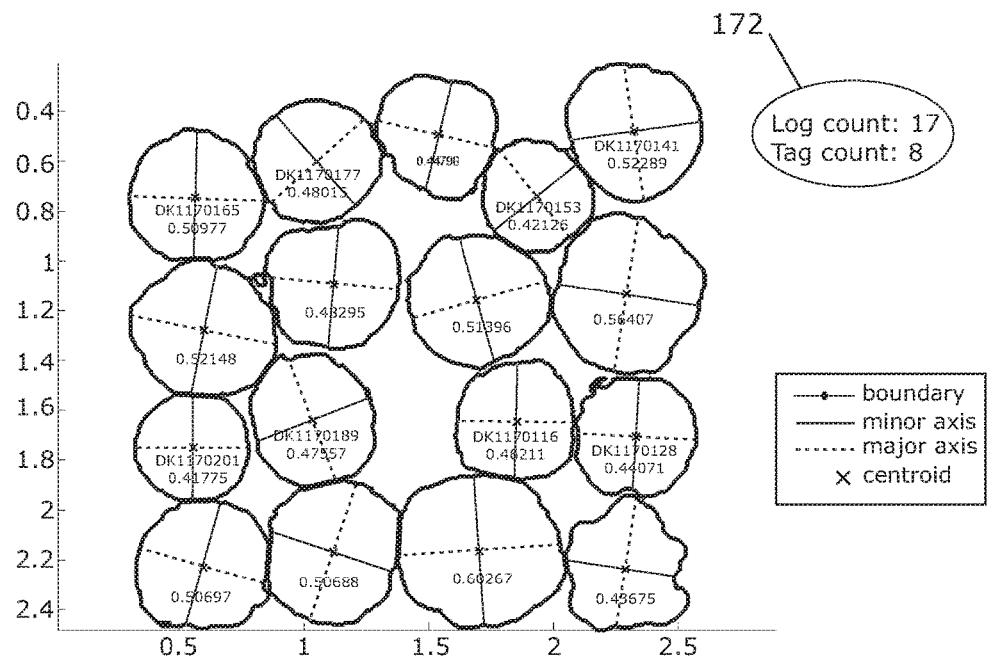
FIG. 32 shows a second diagrammatic log load report generated from a scan of the second load end face of the log load of FIG. 31.

Secondly, turning to a case where there are two load end faces scanned for a log load, in cases where the small ends of logs are mixed between both ends of the load is shown in FIGS. 31 and 32. FIG. 31 shows a diagrammatic representation of the generated load report for the first load end face scanned and FIG. 32 represents the diagrammatic representation of the load report for the scan of the second scan of the other load end face of the log load. FIG. 31 and FIG. 32 collectively represent the diagrammatic representation of the load report for the two load end face scans. It will be noted that the log counts agree in both reports. It can also be noted that some log ends do not have an ID tag in each of the FIGS. 31 and 32, but the sum of the ID tag count is equal to the common log count in each of the FIGS. 31 and 32. This provides a form of validation, i.e. that the counts from each load end and the total tag count must agree.

Figure 33:
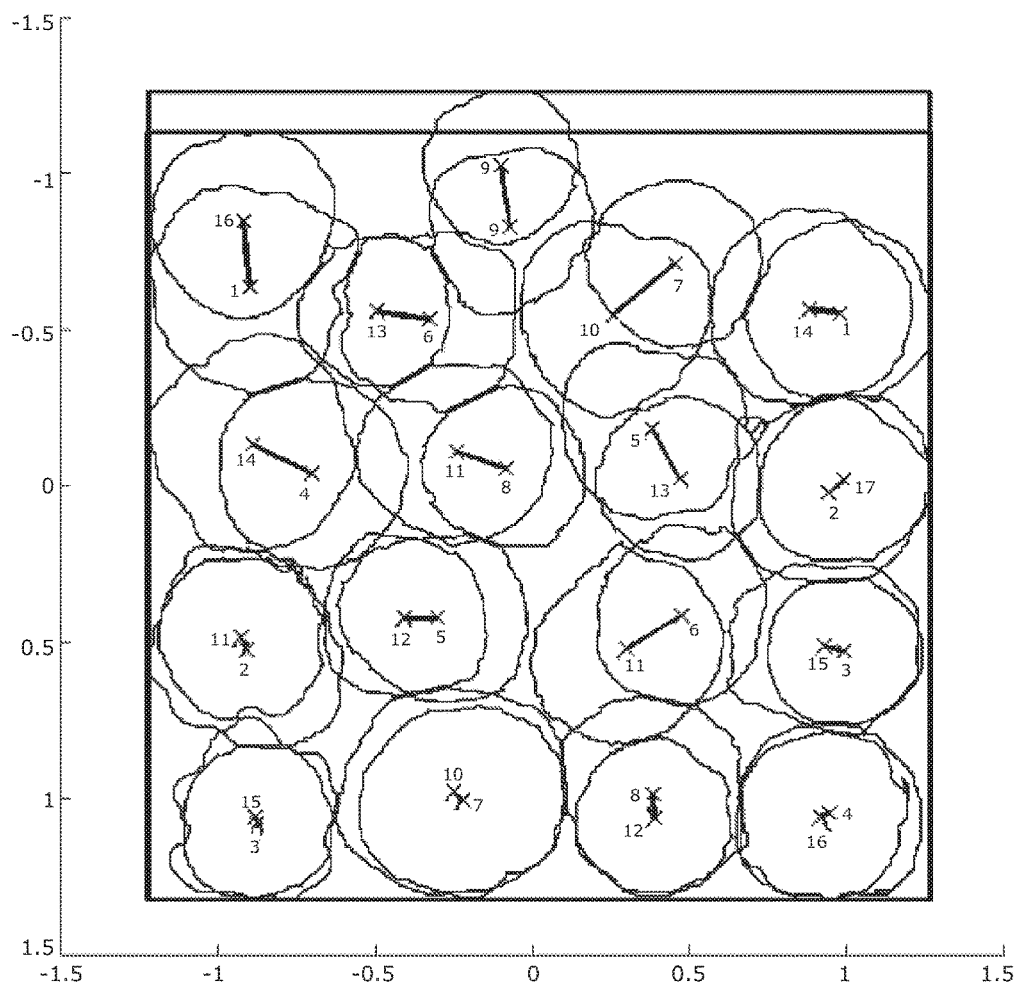
FIG. 33 shows a merged log load report generated from the data from FIGS. 31 and 32.

FIG. 33 shows a diagrammatic form of the merged diagrammatic information from FIGS. 31 and 32 from the two log load end face scans. The merging performed to generate the image of FIG. 33 is a matching operation where a log on one load end is matched with a log on the other load end. The merging is achieved by mirroring one load end and aligning the sides and base of both boundary boxes onto a common coordinate system CSC. The alignment is justified as the width of the load is physically constrained, typically by the log truck cradle, which may be for example approximately 2.2 meters wide typically, although could be varied in other circumstances. This merging algorithm is based on associating costs with various physical properties such as distance between the logs and then finding the match which minimises the sum of the costs. The current merging algorithm uses the following costs:

Coincidence: distance between log centroids.
Tapering: distance between diameters and reference to tapering model.
Tag consistency: tags likely to be at the small end.
Log length: should be similar lengths.

5. Alternative Embodiments and Configurations

Alternative System Configurations

As previously noted, the embodiment of the log scanning system described above is configured to scan a log load for log identification, log counting, and log measuring, such as scaling. In particular, the scan data from the texture sensor is used to obtain the log ID data of the individual logs in the load based on their visible ID elements, such as ID tags. The scan data from the depth sensor is processed to determine the log end boundaries, which can then be measured to provide log end boundary data, such as diameter measurements, associated or linked to each identified log based on the log ID data. Additionally, a log count is generated based on the number of individual log end boundaries identified from the processing of the depth sensor scan data.

In alternative embodiments, the log scanning system may be configured with alternative functionality. By way of example, in a first alternative, the log scanning system may be configured for log identification and log counting. For example, the log ID data may be obtained from the texture sensor scan data as above, and the log count may be generated from the number of individual log end boundaries identified from processing the depth sensor scan data as above. In a second alternative embodiment, the log scanning system may be configured for log identification and log measuring, such as scaling. For example, the log ID data may be obtained from the texture sensor scan data as above, and the log measurements may be determined from processing the depth sensor scan data as above to identify log end boundaries and measuring physical properties of those, such as diameters, and linking the log end boundary data with the respective individual logs based on the log ID data. In a third alternative embodiment, the log scanning system may be configured for log counting only, such as determining a log count based on the number of individual log end boundaries identified from the depth sensor scan data. In a fourth alternative embodiment, the log scanning system may be configured for log measuring, such as scaling, such as measuring one or more physical properties of the log end boundaries.

ID Tags at Large End of Logs

The embodiment above is described in the context of the ID tags being provided or fixed to the small end of the logs. It will be appreciated that in alternative embodiments, the ID tags may be provided on the large end of the logs. In such cases, a scan at each end of the log load scan be carried out and the scan data combined to generate the output data representing the log load. The system can be configured to cater for log loads in which all small ends are at the same end of the log load, or where the small ends are mixed between each end of the log load. In such scenarios, the scan of the small ends provides the scaling and/or counting data, and the scan of the large ends provides the log ID and/or counting data.

Graphical User Interface (GUI) on Operator Interface

Mobile scanners require operator displays that are physically separate from the scanner head because it is difficult in practice to follow a display that moves around. In the embodiment described above, the operator interface device merely comprises a display for presenting real-time images to the user during the scan. However, in alternative embodiments, the operator interface device may be configured to control the scanning system or aspects of the scanning system or handheld scanner. For example, the operator could switch the system on and off, and move it from scanning to acquiring to processing stages by simple button touches, for example using a GUI on a touch screen display interface of the operator interface device. In one configuration, the GUI may be configured to enable an operator to check the log count and numbers of tags identified after the scan. In another configuration, the system can be enhanced to present different sources of information; for example comparing the truck driver's docket with the number of QR tags seen with the number of logs counted. Any discrepancies can be presented in ergonomic visual form with the most likely errors highlighted in red for example. This can be done while the operator is still on the ramp and able to visually compare the load in front of them with the system's processed images. For example, if the system mistakenly merged two log ends into one (and hence obtained too low a count) or split a single log end into two (and hence obtained too high a count), this could be flagged. The most likely problem areas could be highlighted and the error would be obvious to the operator, who would correct the result with, say, a simple pinching or zooming multi-touch gesture on the image.

Use of Depth and Texture Simultaneous Localisation and Mapping (SLAM)

Figure 34:
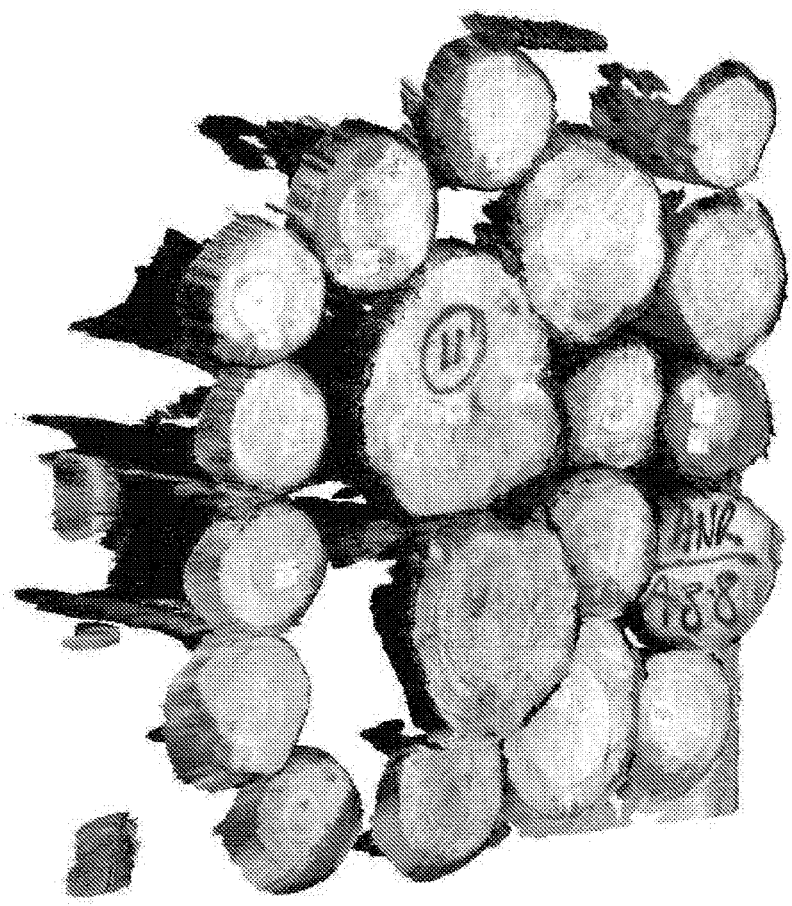
FIG. 34 shows a visual representation of a spatial data structure in the form of a truncated colour function (TCF) generated by fusing the texture images obtained from the scan of a load end face of a log load by the system in an alternative embodiment.

Just as the depth images can be fused together, the texture images can also be fused into a spatial data structure which we refer to as a Truncated Colour Function (TCF) as shown in FIG. 34. Using the TCF and TSDF together can provide more robust and accurate pose estimation than using depth alone. In particular, there is less chance of slippage (partial loss of registration) with depth and texture SLAM. This is because depth data is quite uniform over flat surfaces like log ends, leaving only the log boundaries as hooks for registration. In comparison, texture can contribute by tracking of features such as tree rings, tags, bark and spray paint even over flat surfaces. A major benefit the additional texture information is that the operator can work closer to the load face. Using depth-only registration currently requires about 1.5 m stand-off to allow the depth registration to work robustly.

Better Depth SLAM Directly in Truncated Signed Distance Function (TSDF)

The embodiment described above uses a depth 3D self-registration algorithm based on raycasting to obtain the pose (location and orientation) of the sensor head for each depth image. It is possible to implement depth SLAM by comparing incoming depth images directly with the implicit 3D model (TSDF). These recent algorithms have been shown to be more accurate than those based on raycasting, resulting in finer localisation of the log end boundaries.

Use ID Tags for Discrete SLAM

The QR tags have the useful property that they each have a unique ID. We calculate each tag's centroid (centre point) in each texture image in which it is visible. Because each tag is fixed in position on its log, and is seen from multiple (tens or even hundreds) of different angles in the texture images, it can be used to quickly find or confirm the sensor head's pose. This is done by triangulation between different texture images, using the tag ID for correctly associating various views of the same tag. This kind of discrete SLAM could be used in conjunction with dense depth (and possibly texture) SLAM. It could be used to safeguard the depth SLAM against slippage, because the tag centroids are visible in each corresponding texture image, and the depth sensor is rigidly mounted relative to the texture camera.

Relocalisation of Scanner

A further benefit of tracking ID tags as described above, is that it would enable the system to rapidly re-acquire lock (register itself to the load face). This may be needed either if lock is accidentally lost through unduly fast scanning, or if the operator realises a bit has been missed and wishes to resume the scan. Both the accelerometer and the tag IDs would be used for the system to get its bearings again.

Avoid Occlusion of Log Faces in Raycast Images

In the embodiment above, the system constructs the orthographic depth image (R) of the load face by raycasting. This image is used by the log singulation algorithm for determining log boundaries and counting them. The orthographic image shows the load face end by parallel (map) projection. Orthographic projection is useful because it preserves log end shape and size (no perspective distortion) and nearly maximises the visibility of the log ends. However, loads are not always ideal in practice, with logs not stacked straight or not cut square, and with strips of bark sometimes overhanging the log ends. Log singulation performance might be improved if the algorithm was given several images of the load face raycast at different angles.

In another configuration, the system may use an alternative representation instead of the orthographic depth image in which each pixel is a depth value. Space occupancy can be represented in a small volume structure in which each bit in each pixel encodes whether a voxel (volume element) is filled or not. Assuming pixels with 256 bits each (8 bytes), and a voxel size of 3.5 mm, occupancy can be modelled over a depth range of about 900 mm around the load face. Such an alternative representation would contain more information on the load face. It allows downstream algorithms to look past occluding obstacles such as bark and splinters, and to model the sides of the log where these have been scanned.

Alternative Visualisation During Scanning

In the embodiment described above, the operator device interface is configured to show the operator a live display of the streaming texture images, supplemented by warning indications where the depth data have dropped out (due to IR interference for example). This display is effective in showing the operator where the sensor head is pointed and to some extent what the quality of the captured data is. It does not however help the operator know which parts of the load face have been scanned or whether the depth registration algorithm is maintaining lock in forming the 3D model. It could be possible to show the operator a scaled-down version of the 3D model as it is being built. This would immediately show which areas have been scanned and which parts may need revisiting. The current field of view of the sensor head can be shown on the rendered 3D model as a moving viewfinder frame.

More Log End Information

In the process of singulating log ends, the system finds the complete log end boundary. This provides an opportunity to derive other measurements such as log end area, or more complex diameter measurements, in addition to current JAS diameter measurements.

Enhanced Merging

Merging load ends is a key operation when the small ends are mixed between both ends of the log load. Additional algorithmic cost functions can be added to make this operation even more robust. Currently costs based on location, length, tags, and tapering are used. Costs based on other properties such as pairwise log penetration can also be added. It is also possible to enhance the tag cost.

Light Source

Ideally the system should operate in any light conditions, the main illumination requirements being that QR tags should be readable and bark boundaries should be visible. Lighting above or around the load may be more of a hindrance than a help, because protruding logs or bark can cast shadows on other log ends. The least disruptive illumination is likely to comprise lights on the sensor head, because that would minimise visibility of shadows in the texture images. Lighting co-axial with rays in the texture view frustum may however produce unwanted specularities (bright reflections) from shiny gum, wet logs or QR tags. This is not insurmountable; the mitigation is that we have several views of each log end from different angles to choose the best texture from. A possible configuration could be an array of superbright LEDs mounted around the texture camera lens. This can produce bright light on the load face and substantially reduce shadows from conventional overhead lighting. By strobing the LEDs in short pulses synchronised with the texture camera exposure, brightness can be maximised at relatively low average power, which lowers battery requirements. The strobe frequency would have to be not less than about 60 Hz in order not to produce unpleasant visible strobing—the strobe signal can be obtained from the depth sensor's 30 Hz sync pulse via a frequency multiplier.

6. General

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated in the figures may be rearranged and/or combined into a single component or embodied in several components without departing from the invention. Additional elements or components may also be added without departing from the invention. Additionally, the features described herein may be implemented in software, hardware, as a business method, and/or combination thereof.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the invention includes preferred forms thereof. Modifications may be made thereto without departing from the scope of the invention as defined by the accompanying claims.

The invention claimed is:

1. A log scanning system for scanning a load of logs (log load), each individual log in the log load comprising an ID element comprising unique log ID data on at least one log end face, the system comprising:
a handheld scanner unit for free-form scanning by an operator over a load end face of the log load, the scanner unit comprising sensors for depth sensing and texture sensing, the sensors configured to capture:

a series of depth images of the load end face during the load end face scan; and a texture sensor configured to capture a series of texture images of the load end face during the load end face scan; and a data processor or processors that receives the series of depth images and texture images captured from the scan, and which are configured to:

fuse the depth images into a data model of the load end face;

determine log end boundaries of the individual logs visible in the load end face by processing the data model;

process the texture images to identify and decode any ID elements visible in the scanned load end face to extract individual log ID data for individual logs in the log load; and generate output data representing the log load based on the determined log end boundaries and extracted log ID data.

2. The log scanning system according to claim 1 wherein the data processor or processors are configured to generate output data by measuring one or more physical properties of the log ends based on the determined log end boundaries to generate representative log end boundary data for each log and the generated output data representing the log load comprises the log end boundary data for each log.

3. The log scanning system according to claim 2 wherein the data processor or processors are further configured to generate a link or association between the generated individual log ID data and its respective log end boundary data, and wherein the generated output data representing the log load comprises the link or association between the individual log ID data and its respective log end boundary data.

4. The log scanning system according to claim 1 wherein the data processor or processors are configured to generate output data by generating a log count based on the number of determined individual log end boundaries identified from the load end face scan, and wherein the generated output data representing the log load comprises the log count representing the number of logs in the log load.

5. The log scanning system according to claim 1 wherein the handheld scanner unit is configured to operate the sensors to capture the depth images and texture images simultaneously in pairs as the scanner unit is scanned over the entire load end face during a scan, or wherein the handheld scanner unit is configured to operate the sensors such that at least some of the depth and texture images captured in the scan are in pairs simultaneously captured at the same instant in time.

6. The log scanning system according to claim 5 wherein the handheld scanner unit is configured to capture the depth and texture images in pairs simultaneously based on a common trigger signal to the sensors.

7. The log scanning system according to claim 1 wherein each depth image and texture image captures a portion of the load end face, and wherein the field of view of the sensors captures only a portion of the total load end face for each pair of depth and texture images when operated at a predetermined stand-off distance from the load end face, and wherein the series of pairs of depth and texture images collectively capture the entire load end face at the completion of the scan.

8. The log scanning system according to claim 1 wherein the sensors of the handheld scanner unit comprise a depth camera, and wherein the depth camera of the handheld scanner unit operates at infra-red frequencies and comprises an infrared filter to reduce noise.

9. The log scanning system according to claim 1 wherein the sensors of the handheld scanner unit comprise a stereo camera.

10. The log scanning system according to claim 1 wherein the sensors of the handheld scanner comprise a texture camera.

11. The log scanning system according to claim 10 wherein the texture camera of the handheld scanner unit is a monochrome camera provided with one or more colour filters configured to enhance a texture image for determining the wood-bark boundary of the log ends, or wherein the texture camera of the handheld scanner unit is a colour camera.

12. The log scanning system according to claim 1 wherein the system further comprises an operator interface device having a display screen that is operatively connected to the handheld scanner unit and which is configured to display scan feedback to the user.

13. A method of identifying and measuring a load of logs (log load), each individual log in the log load comprising an ID element comprising unique log ID data on at least one log end face, the method comprising:

scanning a load end face of the log load with a handheld scanner unit comprising sensors for depth sensing and texture sensing to acquire a series of depth images and texture images of the load end face;

fusing the depth images into a data model of the load end face;

determining log end boundaries of the individual logs visible in the load end face by processing the data model;

processing the texture images to identify and decode any ID elements visible in the scanned load end face to extract the individual log ID data for individual logs in the log load; and generating output data representing the log load based on the determined log end boundaries and extracted log ID data.

14. The log scanning system according to claim 1 wherein the handheld scanner unit is a separate device to the data processor or processors, and wherein the handheld scanner unit is configured to communicate with the data processor or processors over a data link.

15. The log scanning system according to claim 1 wherein the ID elements are machine-readable printed codes, each machine-readable printed code comprising an encoded unique log ID data or code that is assigned to its respective log.

16. The log scanning system according to claim 1 wherein the data processor or processors are configured to fuse the depth images, or depth images and texture images, into a data model of the load end face by:

processing the depth images, or depth images and texture images, to estimate the pose of the handheld scanner unit at each depth image, or depth image and texture image, captured and generating pose estimate data associated with each depth image, or depth image and texture image; and processing the depth images, or depth images and texture images, and pose estimate data into a data model in the form of a spatial data structure.

17. The log scanning system according to claim 1 wherein the data processor or processors are configured to generate the log end boundaries of the individual logs visible in the load end face by processing the data model to generate one or more raycast images, and extracting the log end boundaries from the raycast images, and wherein the one or more raycast images comprise a raycast depth image, and wherein the data processor or processors are further configured to generate a raycast normal image of the load end face, and then further image process the raycast depth image based on the raycast normal image to generate a cleaned raycast depth image that removes non-log features and/or sides of logs, and the cleaned raycast depth image is processed to determine the log end boundaries.

18. The log scanning system according to claim 17 wherein the log end boundaries determined from the one or more raycast images are further refined by the data processor or processors by transforming and projecting the determined log end boundaries onto one or more of the captured texture images, and processing of the texture images in the region of the projected log end boundaries to detect the wood-bark boundary by executing a segmentation algorithm that is configured to process the texture images to detect the wood-bark boundary interface for each log and adjust the projected log end boundary to the detected wood-bark boundary to generate a refined under-bark log end boundary for each log.

19. The log scanning system according to claim 1 wherein the data processor or processors are configured to generate output data by measuring one or more physical properties of the log ends based on determined or refined log end boundaries to generate representative log end boundary data for each log and then generate output data representing the log load comprising the log end boundary data for each log, and wherein the data processor or processors are configured to measure the physical properties of the log ends by:
  calculating the planes associated with each log end face and projecting the determined or refined log end boundaries onto their respective calculated log end planes;
  transforming the log end boundaries and planes into a metric world coordinate system; and
  measuring one or more physical properties of the log ends based on the transformed log end boundaries, wherein the data processor or processors are configured to generate a link or association between the extracted individual log ID data and its respective log end boundary data by triangulating the center of the ID elements based on the texture images to detect which ID element corresponds to which log end boundary and its associated log end boundary data, and generating output data representing the log load that comprises the generated link or association representing this correspondence.

20. The log scanning system according to claim 1 wherein the log load is in situ on a transport vehicle or alternatively resting on the ground or another surface when scanned by the handheld scanner unit.

21. The log scanning system according to claim 1 wherein the ID elements are provided on only the small end of each of the logs in the log load, and wherein where the log load comprises all small ends of the logs at the same load end face, the system is configured to process scan data from only the scan of the load end face comprising the small ends, or where the log load comprises small ends of the logs mixed between both ends of the log load, the system is configured to receive and process data from two separate scans, one scan of each load end face of the log load, and combine or merge the scan data from both scans.

22. The log scanning system according to claim 1 further comprising an operable powered carrier system to which the handheld scanner unit is mounted or carried, and wherein the carrier system is configured to move the handheld scanner unit relative to the log load to scan the load end face either automatically or in response to manual control by an operator.

23. The log scanning system according to claim 1 wherein the sensors of the scanner unit comprise a depth sensor that is configured to capture the series of depth images, and a texture sensor that is configured to capture the series of texture images.

* * * * *